(12) United States Patent
Schmidt et al.

(10) Patent No.: US 8,105,714 B2
(45) Date of Patent: Jan. 31, 2012

(54) LITHIUM-ION BATTERY

(75) Inventors: Craig L. Schmidt, Eagan, MN (US); Erik R. Scott, Maple Grove, MN (US); William G. Howard, Roseville, MN (US); Gaurav Jain, Minneapolis, MN (US)

(73) Assignee: Medtronic, Inc., Minneapolis, MN (US)

( * ) Notice: Subject to any disclaimer, the term of this patent is extended or adjusted under 35 U.S.C. 154(b) by 1227 days.

(21) Appl. No.: 11/777,628

(22) Filed: Jul. 13, 2007

(65) Prior Publication Data

US 2008/0020279 A1 Jan. 24, 2008

Related U.S. Application Data

(63) Continuation-in-part of application No. 11/260,853, filed on Oct. 27, 2005, now Pat. No. 7,635,541, and a continuation-in-part of application No. 10/976,508, filed on Oct. 29, 2004, now Pat. No. 7,337,010, and a continuation-in-part of application No. 10/979,043, filed on Oct. 29, 2004, now Pat. No. 7,807,299, and a continuation-in-part of application No. 10/978,712, filed on Oct. 29, 2004, now Pat. No. 7,682,745, and a continuation-in-part of application No. 10/979,040, filed on Oct. 29, 2004, now Pat. No. 7,811,705.

(60) Provisional application No. 60/624,075, filed on Oct. 29, 2004, provisional application No. 60/647,292, filed on Jan. 26, 2005.

(51) Int. Cl.
*H01M 4/02* (2006.01)

(52) U.S. Cl. ............. 429/209; 429/231.5; 429/231.1; 429/221; 429/149; 429/162

(58) Field of Classification Search .................. 429/209, 429/231.5, 231.1, 221, 149, 162
See application file for complete search history.

(56) References Cited

U.S. PATENT DOCUMENTS

| | | | |
|---|---|---|---|
| 3,462,303 | A | 8/1969 | Reber |
| 3,791,867 | A | 2/1974 | Broadhead et al. |
| 3,864,167 | A | 2/1975 | Broadhead et al. |
| 3,898,096 | A | 8/1975 | Herédy et al. |

(Continued)

FOREIGN PATENT DOCUMENTS

EP 0 567 149 B1 10/1993

(Continued)

OTHER PUBLICATIONS

Notice of Allowance for U.S. Appl. No. 10/979,040, dated Jun. 11, 2010, 13 pages.

(Continued)

*Primary Examiner* — Laura Weiner
(74) *Attorney, Agent, or Firm* — Scott A. Marks; Foley & Lardner LLP

(57) ABSTRACT

A lithium-ion battery includes a plurality of generally planar positive and negative electrodes arranged in alternating fashion to form an electrode stack. Each of the electrodes includes a current collector having two opposed surfaces and an active material provided on at least one of the two opposed surfaces. The active material of the negative electrodes has a potential that is greater than 0.2 volts versus a reference electrode. The area of the current collectors of the negative electrodes covered by active material is not larger than the area of the current collectors of the positive electrodes covered by active material.

35 Claims, 13 Drawing Sheets

U.S. PATENT DOCUMENTS

| | | | |
|---|---|---|---|
| 4,009,052 A | 2/1977 | Whittingham | |
| 4,048,397 A | 9/1977 | Rothbauer | |
| 4,049,887 A | 9/1977 | Whittingham | |
| 4,113,921 A | 9/1978 | Goldstein et al. | |
| 4,194,062 A | 3/1980 | Carides et al. | |
| 4,202,702 A | 5/1980 | Nuss | |
| 4,340,652 A | 7/1982 | Raistrick et al. | |
| 4,446,212 A | 5/1984 | Kaun | |
| 4,464,447 A | 8/1984 | Lazzari et al. | |
| 4,507,371 A | 3/1985 | Thackeray et al. | |
| 4,547,442 A | 10/1985 | Besenhard et al. | |
| 4,555,456 A | 11/1985 | Kanehori et al. | |
| 4,668,595 A | 5/1987 | Yoshino et al. | |
| 4,764,437 A | 8/1988 | Kaun | |
| 4,830,939 A | 5/1989 | Lee et al. | |
| H723 H | 1/1990 | Plichta et al. | |
| 5,053,297 A | 10/1991 | Yamahira et al. | |
| 5,077,151 A | 12/1991 | Yasuda et al. | |
| 5,147,737 A | 9/1992 | Post et al. | |
| 5,147,739 A | 9/1992 | Beard | |
| 5,160,712 A | 11/1992 | Thackeray et al. | |
| 5,162,170 A | 11/1992 | Miyabayashi et al. | |
| 5,162,178 A | 11/1992 | Ohsawa et al. | |
| 5,169,736 A | 12/1992 | Bittihn et al. | |
| 5,176,969 A | 1/1993 | Miyabayashi et al. | |
| 5,187,033 A | 2/1993 | Koshiba | |
| 5,187,035 A | 2/1993 | Miyabayashi et al. | |
| 5,196,279 A | 3/1993 | Tarascon | |
| 5,264,201 A | 11/1993 | Dahn et al. | |
| 5,284,721 A | 2/1994 | Beard | |
| 5,296,318 A | 3/1994 | Gozdz et al. | |
| 5,300,373 A | 4/1994 | Shackle | |
| 5,322,746 A | 6/1994 | Wainwright | |
| 5,340,666 A | 8/1994 | Tomantschger et al. | |
| 5,401,598 A | 3/1995 | Miyabayashi et al. | |
| 5,411,537 A | 5/1995 | Munshi et al. | |
| 5,418,090 A | 5/1995 | Koksbang et al. | |
| 5,498,489 A | 3/1996 | Dasgupta et al. | |
| 5,510,212 A | 4/1996 | Delnick et al. | |
| 5,525,441 A | 6/1996 | Reddy et al. | |
| 5,545,468 A | 8/1996 | Koshiba et al. | |
| 5,547,785 A | 8/1996 | Yumiba et al. | |
| 5,569,553 A | 10/1996 | Smesko et al. | |
| 5,576,608 A | 11/1996 | Nagai et al. | |
| 5,652,072 A | 7/1997 | Lamanna et al. | |
| 5,670,862 A | 9/1997 | Lewyn | |
| 5,691,081 A | 11/1997 | Krause et al. | |
| 5,744,258 A | 4/1998 | Bai et al. | |
| 5,744,264 A | 4/1998 | Barker | |
| 5,776,628 A | 7/1998 | Kraft et al. | |
| 5,851,696 A | 12/1998 | Saidi et al. | |
| 5,882,218 A | 3/1999 | Reimers | |
| 5,888,665 A | 3/1999 | Bugga et al. | |
| 5,891,592 A | 4/1999 | Mao et al. | |
| 5,911,947 A | 6/1999 | Mitchell | |
| 5,935,724 A | 8/1999 | Spillman et al. | |
| 5,935,728 A | 8/1999 | Spillman et al. | |
| 5,968,681 A | 10/1999 | Miura et al. | |
| 6,001,139 A | 12/1999 | Asanuma et al. | |
| 6,001,507 A | 12/1999 | Ono et al. | |
| 6,007,947 A | 12/1999 | Mayer | |
| 6,022,643 A | 2/2000 | Lee et al. | |
| 6,025,093 A | 2/2000 | Herr | |
| 6,060,186 A | 5/2000 | Broussely et al. | |
| 6,067,474 A | 5/2000 | Schulman et al. | |
| 6,120,938 A | 9/2000 | Atsumi et al. | |
| 6,139,815 A | 10/2000 | Atsumi et al. | |
| 6,165,638 A | 12/2000 | Spillman et al. | |
| 6,165,646 A | 12/2000 | Takada et al. | |
| 6,171,729 B1 | 1/2001 | Gan et al. | |
| 6,203,947 B1 | 3/2001 | Peled et al. | |
| 6,203,994 B1 | 3/2001 | Epps et al. | |
| 6,207,327 B1 | 3/2001 | Takada et al. | |
| 6,221,531 B1 | 4/2001 | Vaughey et al. | |
| 6,228,536 B1 | 5/2001 | Wasynczuk | |
| 6,258,473 B1 | 7/2001 | Spillman et al. | |
| 6,265,100 B1 | 7/2001 | Saaski et al. | |
| 6,274,271 B1 | 8/2001 | Koshiba et al. | |
| 6,287,721 B1 | 9/2001 | Xie et al. | |
| 6,316,145 B1 | 11/2001 | Kida et al. | |
| 6,335,115 B1 | 1/2002 | Meissner | |
| 6,352,798 B1 | 3/2002 | Lee et al. | |
| 6,365,301 B1 | 4/2002 | Michot et al. | |
| 6,372,384 B1 | 4/2002 | Fujimoto et al. | |
| 6,379,842 B1 | 4/2002 | Mayer | |
| 6,451,480 B1 | 9/2002 | Gustafson et al. | |
| 6,453,198 B1 | 9/2002 | Torgerson et al. | |
| 6,461,751 B1 | 10/2002 | Boehm et al. | |
| 6,461,757 B1 | 10/2002 | Sasayama et al. | |
| 6,475,673 B1 | 11/2002 | Yamawaki et al. | |
| 6,489,062 B1 | 12/2002 | Watanabe et al. | |
| 6,503,662 B1 | 1/2003 | Hamamoto et al. | |
| 6,528,208 B1 | 3/2003 | Thackeray et al. | |
| 6,553,263 B1 | 4/2003 | Meadows et al. | |
| 6,596,439 B1 | 7/2003 | Tsukamoto et al. | |
| 6,605,382 B2 | 8/2003 | Ruth et al. | |
| 6,641,953 B2 | 11/2003 | Takeuchi et al. | |
| 6,645,670 B2 | 11/2003 | Gan | |
| 6,645,675 B1 | 11/2003 | Munshi | |
| 6,670,071 B2 | 12/2003 | Skinlo et al. | |
| 6,673,493 B2 | 1/2004 | Gan et al. | |
| 6,677,083 B2 | 1/2004 | Suzuki et al. | |
| 6,706,445 B2 | 3/2004 | Barker et al. | |
| 6,720,112 B2 | 4/2004 | Barker et al. | |
| 6,730,437 B2 | 5/2004 | Leising et al. | |
| 6,737,191 B2 | 5/2004 | Gan et al. | |
| 6,759,168 B2 | 7/2004 | Yamasaki et al. | |
| 6,761,744 B1 | 7/2004 | Tsukamoto et al. | |
| 6,777,132 B2 | 8/2004 | Barker et al. | |
| 6,824,920 B1 | 11/2004 | Iwamoto et al. | |
| 6,841,304 B2 | 1/2005 | Michot et al. | |
| 6,849,360 B2 | 2/2005 | Marple | |
| 6,869,724 B2 | 3/2005 | Suzuki et al. | |
| 6,905,795 B2 | 6/2005 | Jung et al. | |
| 6,905,796 B2 | 6/2005 | Ishida et al. | |
| 6,908,711 B2 | 6/2005 | Fauteux et al. | |
| 6,942,949 B2 | 9/2005 | Besenhard et al. | |
| 6,946,218 B2 * | 9/2005 | Crouch et al. | 429/185 |
| 6,951,576 B1 | 10/2005 | Takeuchi | |
| 7,018,743 B2 | 3/2006 | Guidi et al. | |
| 7,029,793 B2 | 4/2006 | Nakagawa et al. | |
| 7,101,642 B2 | 9/2006 | Tsukamoto et al. | |
| 7,157,185 B2 | 1/2007 | Marple | |
| 7,177,691 B2 | 2/2007 | Meadows et al. | |
| 7,184,836 B1 | 2/2007 | Meadows et al. | |
| 7,191,008 B2 | 3/2007 | Schmidt et al. | |
| 7,202,000 B2 | 4/2007 | Iriyama et al. | |
| 7,211,350 B2 | 5/2007 | Amatucci | |
| 7,337,010 B2 | 2/2008 | Howard et al. | |
| 7,341,803 B2 * | 3/2008 | Huang et al. | 429/209 |
| 7,459,235 B2 | 12/2008 | Choi et al. | |
| 7,462,425 B2 | 12/2008 | Takami et al. | |
| 7,488,553 B2 | 2/2009 | Tsukamoto et al. | |
| 7,524,580 B1 | 4/2009 | Birke et al. | |
| 7,541,114 B2 | 6/2009 | Ohzuku et al. | |
| 7,582,380 B1 | 9/2009 | Dunstan et al. | |
| 7,632,603 B2 | 12/2009 | Tsukamoto et al. | |
| 7,662,515 B2 | 2/2010 | Inagaki et al. | |
| 7,799,470 B2 | 9/2010 | Cho et al. | |
| 7,807,299 B2 | 10/2010 | Howard et al. | |
| 7,811,703 B2 | 10/2010 | Fujita et al. | |
| 7,818,068 B2 | 10/2010 | Meadows et al. | |
| 2001/0008725 A1 | 7/2001 | Howard | |
| 2001/0012590 A1 | 8/2001 | Ehrlich | |
| 2001/0021472 A1 | 9/2001 | Barker et al. | |
| 2001/0031401 A1 | 10/2001 | Yamawaki et al. | |
| 2003/0025482 A1 | 2/2003 | Tsukamoto et al. | |
| 2003/0104282 A1 | 6/2003 | Xing et al. | |
| 2003/0124423 A1 | 7/2003 | Sasaki et al. | |
| 2003/0129485 A1 | 7/2003 | Guidi et al. | |
| 2003/0157410 A1 | 8/2003 | Jarvis et al. | |
| 2003/0215716 A1 | 11/2003 | Suzuki et al. | |
| 2004/0002005 A1 | 1/2004 | Gao et al. | |
| 2004/0023117 A1 | 2/2004 | Imachi et al. | |
| 2004/0062989 A1 | 4/2004 | Ueno et al. | |
| 2004/0072072 A1 | 4/2004 | Suzuki et al. | |
| 2004/0096745 A1 | 5/2004 | Shibano et al. | |

| | | | |
|---|---|---|---|
| 2004/0147971 A1 | 7/2004 | Greatbatch et al. | |
| 2004/0147972 A1 | 7/2004 | Greatbatch et al. | |
| 2004/0158296 A1 | 8/2004 | Greatbatch et al. | |
| 2004/0168307 A1 | 9/2004 | Hong | |
| 2004/0176818 A1 | 9/2004 | Wahlstrand et al. | |
| 2004/0197657 A1 | 10/2004 | Spitler et al. | |
| 2004/0209156 A1 | 10/2004 | Ren et al. | |
| 2005/0031919 A1 | 2/2005 | Ovshinsky et al. | |
| 2005/0069777 A1 | 3/2005 | Takami et al. | |
| 2005/0130043 A1 | 6/2005 | Gao et al. | |
| 2005/0147889 A1 | 7/2005 | Ohzuku et al. | |
| 2005/0164082 A1 | 7/2005 | Kishi et al. | |
| 2005/0244716 A1 | 11/2005 | Ogawa et al. | |
| 2006/0024582 A1 | 2/2006 | Li et al. | |
| 2006/0046149 A1 | 3/2006 | Yong et al. | |
| 2006/0068282 A1 | 3/2006 | Kishi et al. | |
| 2006/0093871 A1 | 5/2006 | Howard et al. | |
| 2006/0093872 A1 | 5/2006 | Howard et al. | |
| 2006/0093873 A1 | 5/2006 | Howard et al. | |
| 2006/0093894 A1 | 5/2006 | Scott et al. | |
| 2006/0093913 A1 | 5/2006 | Howard et al. | |
| 2006/0093916 A1 | 5/2006 | Howard et al. | |
| 2006/0093917 A1 | 5/2006 | Howard et al. | |
| 2006/0093918 A1 | 5/2006 | Scott et al. | |
| 2006/0093921 A1 | 5/2006 | Scott et al. | |
| 2006/0093923 A1 | 5/2006 | Howard et al. | |
| 2006/0095094 A1 | 5/2006 | Howard et al. | |
| 2006/0216612 A1 | 9/2006 | Jambunathan et al. | |
| 2006/0234125 A1 | 10/2006 | Valle | |
| 2006/0251968 A1 | 11/2006 | Tsukamoto et al. | |
| 2007/0009801 A1 | 1/2007 | Inagaki et al. | |
| 2007/0059587 A1 | 3/2007 | Kishi et al. | |
| 2007/0072085 A1 | 3/2007 | Chen et al. | |
| 2007/0077496 A1 | 4/2007 | Scott et al. | |
| 2007/0111099 A1 | 5/2007 | Nanjundaswamy et al. | |
| 2007/0134556 A1 | 6/2007 | Sano et al. | |
| 2007/0162083 A1 | 7/2007 | Schmidt et al. | |
| 2007/0233195 A1 | 10/2007 | Wahlstrand et al. | |
| 2007/0239221 A1 | 10/2007 | Kast et al. | |
| 2007/0248881 A1 | 10/2007 | Scott et al. | |
| 2007/0284159 A1 | 12/2007 | Takami et al. | |
| 2008/0020278 A1 | 1/2008 | Schmidt et al. | |
| 2008/0026297 A1 | 1/2008 | Chen et al. | |
| 2008/0044728 A1 | 2/2008 | Schmidt et al. | |
| 2008/0241689 A1 | 10/2008 | Takami et al. | |
| 2009/0035662 A1 | 2/2009 | Scott et al. | |
| 2009/0075166 A1 | 3/2009 | Takami et al. | |
| 2009/0286158 A1 | 11/2009 | Howard et al. | |

FOREIGN PATENT DOCUMENTS

| | | |
|---|---|---|
| EP | 0 732 761 A1 | 9/1996 |
| EP | 0 982 790 A1 | 3/2000 |
| EP | 1 014 465 A1 | 6/2000 |
| EP | 1 018 773 A1 | 7/2000 |
| EP | 1 069 635 A1 | 1/2001 |
| EP | 1 282 180 A1 | 2/2003 |
| EP | 1 487 039 A1 | 12/2004 |
| EP | 1 722 439 A1 | 11/2006 |
| JP | 56-136462 A | 10/1981 |
| JP | 57-11476 A | 1/1982 |
| JP | 63-1708 B2 | 1/1982 |
| JP | 57-152669 A | 9/1982 |
| JP | 02-309568 A | 12/1990 |
| JP | 6-275263 A | 9/1994 |
| JP | 10-27626 A | 1/1998 |
| JP | 2000-156229 A | 6/2000 |
| JP | 2000-195499 | 7/2000 |
| JP | 2001-126756 | 5/2001 |
| JP | 2001-185141 | 7/2001 |
| WO | WO 97/06569 A1 | 2/1997 |
| WO | WO 97/48141 | 12/1997 |
| WO | WO 00/17950 | 3/2000 |
| WO | WO 01/33656 A1 | 5/2001 |
| WO | WO 02/09215 A2 | 1/2002 |
| WO | WO 02/21628 A1 | 3/2002 |
| WO | WO 02/39524 A1 | 5/2002 |
| WO | WO 02/069414 A2 | 9/2002 |
| WO | WO 02/095845 A1 | 11/2002 |
| WO | WO 03/044880 A1 | 5/2003 |
| WO | WO 03/075371 A2 | 9/2003 |
| WO | WO 03/075376 A1 | 9/2003 |
| WO | WO 03/090293 A2 | 10/2003 |
| WO | WO 2006/050022 A2 | 5/2006 |
| WO | WO 2006/050023 A2 | 5/2006 |
| WO | WO 2006/050098 A1 | 5/2006 |
| WO | WO 2006/050099 A1 | 5/2006 |
| WO | WO 2006/050100 A2 | 5/2006 |
| WO | WO 2006/050117 A2 | 5/2006 |
| WO | WO 2006/064344 A2 | 6/2006 |

OTHER PUBLICATIONS

Restriction Requirement for U.S. Appl. No. 12/454,718, dated Sep. 22, 2009, 9 pages.
Restriction Response for U.S. Appl. No. 12/454,718, filed Oct. 22, 2009, 11 pages.
Non-Final Office Action for U.S. Appl. No. 12/454,718, dated Dec. 1, 2009, 7 pages.
Reply and Amendment for U.S. Appl. No. 12/454,718, filed Mar. 1, 2010, 13 pages.
Non-Final Office Action for U.S. Appl. No. 12/454,718, dated Apr. 21, 2010, 6 pages.
Reply and Amendment for U.S. Appl. No. 12/454,718, filed Jul. 21, 2010, 10 pages.
Final Office Action for U.S. Appl. No. 12/454,718, dated Aug. 25, 2010, 8 pages.
Reply and Amendment and Terminal Disclaimer for U.S. Appl. No. 12/454,718, filed Sep. 23, 2010, 12 pages.
Notice of Allowance for U.S. Appl. No. 12/454,718, dated Sep. 30, 2010, 6 pages.
Restriction Requirement for U.S. Appl. No. 11/777,599, dated Dec. 8, 2010, 8 pages.
Restriction Response for U.S. Appl. No. 11/777,599, filed Jan. 10, 2011, 9 pages.
Restriction Requirement for U.S. Appl. No. 11/777,609, dated Dec. 13, 2010, 8 pages.
Restriction Response for U.S. Appl. No. 11/777,609, filed Jan. 13, 2011, 9 pages.
"Battery Materials—Ceramic Anode Material for 2.4 V Lithium-Ion Batteries"—EXM 1037—$Li_4Ti_5O_{12}$ (1 page), available at least by Oct. 25, 2004.
Ariyoshi, et al., "Three-Volt Lithium-Ion Battery with $Li[Ni_{frac;1;2}Mn_{frac;3;2}]O_4$ and the Zero-Strain Insertion Material of $Li[Li_{frac;1;3}Ti_{frac;5;3}]O_4$,", Journal of Power Sources, 119-121, 2003, pp. 959-963.
Brohan et al., Properties Physiques Des Bronzes $M_xTiO_2(B)$, Solid State Ionics, vols. 9 and 10, 1983, © North Holland Publishing Company, pp. 419-424.
Cava et al., The Crystal Structures of the Lithium-Inserted Metal Oxides $Li_{0.5}TiO_2$ Anatase, $LiTi_2O_4$ Spinel, and $Li_2Ti_2O_4$, Journal of Solid State Chemistry, vol. 53, Jan. 1984 © Academic Press, Inc., pp. 64-75.
Colbow et al., Structure and Electrochemistry of the Spinel Oxides $LiTi_2O_4$ and $Li_{frac;4;3}Ti_{frac;5;3}O_4$, Journal of Power Sources, vol. 26, 1989, © Elsevier Sequoia, pp. 397-402.
Dahn et al., "Combinatorial Study of Sn1-xCox (0<x<0.6) and [Sn0.55Co0.45]1-yCy (0<y<0.5) Alloy Negative Electrode Materials for Li-Ion Batteries," Journal of Electrochemical Society, vol. 153, 2006, pp. A361-A365.
Fauteux et al., "Rechargeable lithium battery anodes: alternatives to metallic lithium," Journal of Applied Electrochemistry, vol. 23, 1993, pp. 1-10.
Ferg et al, "Spinel Anodes for Lithium-Ion Batteries", J. Electrochem. Soc. vol. 141 #11, 1994, pp. L147-L150.
FMC Lithium, CAS No. 74389-93-2, "Stabilized Lithium Metal Powder" Product Specification, Copyright 2001 FMC Corporation (2 pages).
Guerfi, et. al., "Nano Electronically Conductive Titanium-Spinel as Lithium Ion Storage Negative Electrode", Journal of Power Sources, 126, 2004, pp. 163-168.
Guyomard et al., "New amorphous oxides as high capacity negative electrodes for lithium6 batteries the LixMV04 (M=Ni, Co, Cd, Zn; 1 <x<8) series," Journal of Power Sources, vol. 68, 1997, pp. 692-697.

Jansen, et. al., "Development of a High-Power Lithium-Ion Battery", Journal of Power Sources, 81-82, 1999, pp. 902-905.

Jarvis et al., "A Li-Ion Cell Containing a Non-Lithiated Cathode", Abs. 182, IMLB 12 Meeting (1 page).

Kavan, et al., Proof of Concept—$Li_4Ti_5O_{12}$, Electrochemical and Solid State Letters, 2002, vol. 5, A39-A42, p. 13.

Linden, David, Editor in Chief, Handbook of Batteries, Second Edition, McGraw-Hill, NY, 1995, 6 pages.

Mikula et al., Photoelectrochemical Properties of Anodic $TiO_2$ Layers Prepared by Various Current Densities, J. Electrochemical Society, vol. 139, No. 12, Dec. 1992 © The Electrochemical Society, Inc., pp. 3470-3474.

Murphy et al., "Topochemical Reactions of Rutile Related Structures with Lithium", Mat. Res. Bull, vol. 13, No. 12, 1978, © Pergamon Press, Inc., pp. 1395-1402.

Murphy et al., Lithium Insertion in Anatase: A New Route to the Spinel $LiTi_2O_4$, Revue De Chimie Minerale, vol. 19, 1982, 9 pgs.

Murphy et al., Ternary $Li_xTiO_2$ Phases from Insertion Reactions, Solid State Ionics, vols. 9 & 10, 1983 © North-Holland Publishing Company, pp. 413-417.

Nakahara, et al. "Preparation of Particulate $Li_4Ti_5O_{12}$ Having Excellent Characteristics As an Electrode Active Material for Power Storage Cells", Journal of Power Sources, 117, 2003, pp. 131-136.

New $Li_4Ti_5O_{12}$ Anode Material of Süd-Chemie AG for Lithium Ion Batteries, Süd-Chemie EXM 1037—$Li_4Ti_5O_{12}$, Product Specification (2 pages).

Ohsuku et al., "Why transition metal (di)oxides are the most attractive materials for batteries," Solid State Ionics, vol. 69, 1994, pp. 201-211.

Ohzuku et al., "Lithium-Ion Batteries of $Li[Li_{frax;1;3}Ti_{frax;5;3}]O_4$ With Selected Positive-Electrode Materials for Long-Life Power Application", Abs. 23, IMLB 12 Meeting (1 page).

Ohzuku, et al, "Zero-Strain Insertion Material of $Li[Li_{frax;1;3}Ti_{frax;5;3}]O_4$ for Rechargeable Lithium Cells", J. Electrochem. Soc. vol. 142 #5, 1995, pp. 1431-1435.

Ohzuku, Extended Abstracts from the Seventh Int'l Meeting on Li Batteries, Boston, MA, May 15-20, 1994, cover and pp. 111-112.

Peramunage et al., Preparation of Micro-Sized $Li_4Ti_5O_{12}$ and Its Electrochemistry in Polyacrylonitrile Electrolye-Based Lithium Cells, Technical Papers, Electrochemical Science and Technology, J. Electrochem Soc., vol. 145, No. 8, Aug. 1998 © The Electrochemical Society, Inc., 7 pages.

Poizot et al., "Nano-sized transition-metal oxides as negative-electrode materials for lithium-ion batteries," Nature, vol. 407, 2000, cover and pp. 496-499.

Prosini, et. al., "$Li_4Ti_5O_{12}$ As Anode in All-Solid-State, Plastic, Lithium-Ion Batteries for Low-Power Applications" Solid State Ionics, 144, 2001, pp. 185-192.

Sasaki et al., Layered Hydrous Titanium Dioxide: Potassium Ion Exchange and Structural Characterization, Inorganic Chemistry, vol. 24, No. 8, © 1985 American Chemical Society, cover and pp. 2265-2271.

Sawai, et al., Factors Affecting Rate Capability of a Lithium-ion Battery with $Li[Li_{frax;1;3}Ti_{frax;5;3}]O_4$ and $LiCo_{frax;1;2}Ni_{frax;1;2}O_2$, Abs. 75, 205th Meeting, 1 page.

Scrosati, "Low Voltage Lithium-Ion Cells", Advances in Lithium-Ion Batteries Kluwer Academic/Plenum Publishers, pp. 289-308.

Singhal, et al. "Nanostructured Electrodes for Next Generation Rechargeable Electrochemical Devices", Journal of Power Sources, 129, 2004, pp. 38-44.

Trifonova et al., "Sn-Sb and Sn-Bi Alloys as Anode Materials for Lithium-Ion Batteries," Ionics, vol. 8, 2002, cover and pp. 321-328.

Wang et al., Li Insertion and Ion Exchange Reactions in the Ionic Conducting $TI2(M,Ti)8O16$ Phases with Hollandite-Type Structure, Technical Papers, Solid-State Science and Technology, J. Electrochem Soc., vol. 138, No. 1, Jan. 1991, © The Electrochemical Society, Inc., pp. 166-172.

Wang et al., Novel Electrolytes for Nanocrystalline $Li_4Ti_5O_{12}$ Based High Power Lithium Ion Batteries, 1 page.

Winter et al., "Insertion Electrode Materials for Rechargeable Lithium Batteries," Advanced Materials, vol. 10, 1998, pp. 725-763.

Winter et al., "Electrochemical lithiation of tin and tin-based intermetallics and composites," Electrochimica Acta, vol. 45, 1999, pp. 31-50.

Zaghib, et al, "Electrochemical Study of $Li_4Ti_5O_{12}$ As Negative Electrode for Li-Ion Polymer Rechargeable Batteries", Journal of Power Sources, 81-82, 1999, pp. 300-305.

Preliminary Amendment and Drawings for U.S. Appl. No. 10/979,040, filed Mar. 7, 2005, 11 pages.

Non-Final Office Action for U.S. Appl. No. 10/979,040, dated Apr. 2, 2008, 8 pages.

Reply and Amendment and Declaration Under 1.131 for U.S. Appl. No. 10/979,040, filed Jul. 16, 2008, 33 pages.

Final Office Action for U.S. Appl. No. 10/979,040, dated Sep. 19, 2008, 10 pages.

Request for Continued Examination (RCE) and Reply and Amendment for U.S. Appl. No. 10/979,040, filed Dec. 11, 2008, 16 pages.

Non-Final Office Action for U.S. Appl. No. 10/979,040, dated Jan. 12, 2009, 10 pages.

Reply and Amendment for U.S. Appl. No. 10/979,040, filed Mar. 24, 2009, 12 pages.

Final Office Action for U.S. Appl. No. 10/979,040, dated Jun. 16, 2009, 10 pages.

Reply and Amendment for U.S. Appl. No. 10/979,040, filed Aug. 17, 2009, 13 pages.

Advisory Action for U.S. Appl. No. 10/979,040, dated Aug. 24, 2009, 3 pages.

Request for Continued Examination (RCE) for U.S. Appl. No. 10/979,040, filed Sep. 11, 2009, 3 pages.

Non-Final Office Action for U.S. Appl. No. 10/979,040, dated Sep. 30, 2009, 7 pages.

Reply and Amendment for U.S. Appl. No. 10/979,040, filed Dec. 16, 2009, 10 pages.

Non-Final Office Action for U.S. Appl. No. 10/978,712, dated Apr. 10, 2008, 12 pages.

Reply and Amendment and Declaration Under 1.131 for U.S. Appl. No. 10/978,712, filed Jul. 16, 2008, 36 pages.

Final Office Action for U.S. Appl. No. 10/978,712, dated Oct. 9, 2008, 7 pages.

Request for Continued Examination (RCE), Reply and Amendment, and Terminal Disclaimer for U.S. Appl. No. 10/978,712, filed Dec. 8, 2008, 20 pages.

Non-Final Office Action for U.S. Appl. No. 10/978,712, dated Jan. 5, 2009, 16 pages.

Reply and Amendment for U.S. Appl. No. 10/978,712, filed Mar. 24, 2009, 16 pages.

Final Office Action for U.S. Appl. No. 10/978,712, dated Jun. 17, 2009, 11 pages.

Reply and Amendment for U.S. Appl. No. 10/978,712, filed Aug. 14, 2009, 14 pages.

Advisory Action for U.S. Appl. No. 10/978,712, dated Aug. 27, 2009, 3 pages.

Request for Continued Examination (RCE), Reply and Amendment, and Terminal Disclaimer for U.S. Appl. No. 10/978,712, filed Oct. 19, 2009, 22 pages.

Terminal Disclaimer for U.S. Appl. No. 10/978,712, filed Nov. 11, 2009, 4 pages.

Notice of Allowance for U.S. Appl. No. 10/978,712, dated Dec. 1, 2009, 14 pages.

Non-Final Office Action for U.S. Appl. No. 11/260,853, dated Mar. 5, 2009, 13 pages.

Amendment and Reply for U.S. Appl. No. 11/260,853, filed Jun. 4, 2009, 14 pages.

Notice of Allowance for U.S. Appl. No. 11/260,853, dated Aug. 5, 2009, 7 pages.

Non-Final Office Action for U.S. Appl. No. 10/979,043, dated Apr. 2, 2008, 14 pages.

Amendment and Reply and Declaration Under 1.131 for U.S. Appl. No. 10/979,043, filed Aug. 4, 2008, 60 pages.

Non-Final Office Action for U.S. Appl. No. 10/979,043, dated Oct. 21, 2008, 9 pages.

Amendment and Reply for U.S. Appl. No. 10/979,043, filed Jan. 8, 2009, 17 pages.

Non-Final Office Action for U.S. Appl. No. 10/979,043, dated Feb. 26, 2009, 9 pages.
Amendment and Reply for U.S. Appl. No. 10/979,043, filed May 19, 2009, 16 pages.
Final Office Action for U.S. Appl. No. 10/979,043, dated Jul. 29, 2009, 10 pages.
Amendment and Reply and Terminal Disclaimer for U.S. Appl. No. 10/979,043, filed Oct. 26, 2009, 18 pages.
Advisory Action for U.S. Appl. No. 10/979,043, dated Nov. 4, 2009, 3 pages.
Advisory Action for U.S. Appl. No. 10/979,043, dated Nov. 12, 2009, 3 pages.
Request for Continued Examination (RCE) and Amendment and Reply for U.S. Appl. No. 10/979,043, filed Nov. 25, 2009, 15 pages.
Notice of Allowance and Interview Summary for U.S. Appl. No. 10/979,043, dated Dec. 28, 2009, 14 pages.
Non-Final Office Action for U.S. Appl. No. 10/976,508, dated Jul. 14, 2006, 10 pages.
Amendment and Reply for U.S. Appl. No. 10/976,508, filed Oct. 4, 2006, 17 pages.
Final Office Action for U.S. Appl. No. 10/976,508, dated Jan. 11, 2007, 6 pages.
Amendment and Reply for U.S. Appl. No. 10/976,508, filed Mar. 12, 2007, 19 pages.
Non-Final Office Action for U.S. Appl. No. 10/976,508, dated May 3, 2007, 4 pages.
Amendment and Reply and Terminal Disclaimer for U.S. Appl. No. 10/976,508, filed Jul. 19, 2007, 21 pages.
Terminal Disclaimer for U.S. Appl. No. 10/976,508, filed Sep. 27, 2007, 4 pages.
Terminal Disclaimer for U.S. Appl. No. 10/976,508, filed Oct. 5, 2007, 6 pages.
Notice of Allowance and Interview Summary for U.S. Appl. No. 10/976,508, dated Oct. 25, 2007, 7 pages.
U.S. Appl. No. 12/112,979, filed Apr. 30, 2008, Scott et al.
International Search Report and Written Opinion for Application No. PCT/US2008/082598, date of mailing Feb. 18, 2009, 11 pages.
Final Office Action for U.S. Appl. No. 10/979,040, dated Feb. 25, 2010, 8 pages.
English Translation of Second Office Action for Chinese Application No. 200580036854.4, dated Nov. 20, 2009, 8 pages.
English Translation of Response to Second Office Action for Chinese Application No. 200580036854.4, filed Apr. 5, 2010, 5 pages.
Reply and Amendment for U.S. Appl. No. 10/979,040, filed Apr. 22, 2010, 12 pages.
Advisory Action for U.S. Appl. No. 10/979,040, dated Apr. 27, 2010, 3 pages.
Request for Continued Examination (RCE) for U.S. Appl. No. 10/979,040, filed May 7, 2010, 4 pages.
Belharouak et al., "On the Safety of the $Li_4Ti_5O_{12}/LiMn_2O_4$ Lithium-Ion Battery System," (ECS) *Journal of The Electrochemical Society*, 2007, pp. A1083-A1087, vol. 154, No. 12.
Christensen et al., "Optimization of Lithium Titanate Electrodes for High-Power Cells," (ECS) *Journal of The Electrochemical Society*, 2006, pp. A560-A565, vol. 153, No. 3.
Sun et al., "The Compatibility of a Boron-Based Anion Receptor with the Carbon Anode in Lithium-Ion Batteries," (ECS) *Electrochemical and Solid-State Letters*, 2003, pp. A43-A46, vol. 6, No. 2.
Sun et al., "Using a Boron-Based Anion Receptor Additive to Improve the Thermal Stability of $LiPF_6$-Based Electrolyte for Lithium Batteries," (ECS) *Electrochemical and Solid-State Letters*, 2002, pp. A248-A251, vol. 5, No. 11.
International Search Report and Written Opinion for Application No. PCT/US2008/066803, date of mailing Oct. 7, 2008, 12 pages.
International Search Report and Written Opinion for Application No. PCT/US2008/066809, mailing date Oct. 29, 2008, 8 pages.
International Search Report and Written Opinion for Application No. PCT/US2008/066801, mailing date Oct. 29, 2008, 10 pages.
Non-Final Office Action for U.S. Appl. No. 11/777,599, dated Feb. 1, 2011, 20 pages.
Non-Final Office Action for U.S. Appl. No. 11/777,609, dated Feb. 2, 2011, 18 pages.
Non-Final Office Action for U.S. Appl. No. 11/777,599, dated Jul. 8, 2011, 17 pages.
Final Office Action for U.S. Appl. No. 11/777,609, dated Jul. 7, 2011, 16 pages.
Response to Office Action for U.S. Appl. No. 11/777,609, filed Sep. 7, 2011, 11 pages.
Amendment and Reply for U.S. Appl. No. 11/777,599, filed May 2, 2011, 19 pages.
Amendment and Reply for U.S. Appl. No. 11/777,609, filed May 2, 2011, 16 pages.

* cited by examiner

LITHIUM-ION BATTERY

CROSS-REFERENCE TO RELATED PATENT APPLICATIONS

This application is a Continuation-In-Part of and incorporates herein by reference each of the following patent applications in their entirety: U.S. patent application Ser. No. 10/978,712, filed Oct. 29, 2004 (now U.S. Pat. No. 7,682,745); U.S. patent application Ser. No. 10/979,043, filed Oct. 29, 2004 (now U.S. Pat. No. 7,807,299); U.S. patent application Ser. No. 10/979,040, filed Oct. 29, 2004 (now U.S. Pat. No. 7,811,705); U.S. patent application Ser. No. 10/976,508, filed Oct. 29, 2004 (now U.S. Pat. No. 7,337,010); and U.S. patent application Ser. No. 11/260,853, filed Oct. 27, 2005 (now U.S. Pat. No. 7,635,541), which claims priority from U.S. Patent Provisional Application No. 60/624,075, filed Oct. 29, 2004 and U.S. Provisional Patent Application No. 60/647,292, filed Jan. 26, 2005.

BACKGROUND

The present invention relates generally to the field of lithium-ion batteries and methods of making such batteries.

Lithium-ion batteries or cells include one or more positive electrodes, one or more negative electrodes, and an electrolyte provided within a case or housing. Separators made from a porous polymer or other suitable material may also be provided intermediate or between the positive and negative electrodes to prevent direct contact between adjacent electrodes. The positive electrode includes a current collector (e.g., aluminum such as an aluminum foil) having an active material provided thereon (e.g., $LiCoO_2$), and the negative electrode includes a current collector (e.g., copper such as a copper foil) having an active material (e.g., a carbonaceous material such as graphite) provided thereon. The active materials for the positive and negative electrodes may be provided on one or both sides of the current collectors.

During charging and discharging of the battery, lithium ions move between the positive electrode and the negative electrode. For example, lithium ions flow from the negative electrode to the positive electrode during discharging of the battery, and in the opposite direction during charging.

One issue associated with conventional secondary (i.e., rechargeable) lithium-ion batteries is lithium plating. Lithium plating, which is a well-known phenomenon characterized by a buildup of lithium metal on the negative electrode, may occur when the potential of the negative electrode drops to 0.0 volts (V) versus $Li/Li^+$. Lithium plating can result in decreased battery capacity, since the buildup of lithium on the negative electrode decreases the amount of cyclable lithium available in the battery. Internal battery shorts may also result from lithium plating, for example, when the buildup of lithium becomes so significant that dendrites form on the negative electrode and extend to and make contact with an adjacent positive electrode.

The issue of lithium plating is particularly problematic in batteries having negative active materials that exhibit relatively low potentials versus $Li/Li^+$. Carbon-based active materials commonly used in lithium secondary batteries, for example, have an average potential of approximately 0.1 V versus $Li/Li^+$.

To reduce the likelihood of lithium plating, battery manufacturers typically provide excess negative electrode capacity to balance the positive electrode capacity, particularly at relatively high-current regions of the negative electrodes (e.g., edges of the electrodes). The additional negative active material provides additional intercalation sites for the cyclable lithium originating with the positive active material.

One method of providing additional negative active material is to utilize negative electrodes that have different (e.g., larger) physical dimensions than the positive electrodes. Depending on the type of battery configuration involved (e.g., wound electrode, flat plate electrode, Z-fold electrode, etc.), the manner in which the dimensions of the negative electrode differ from that of the positive electrode may vary.

For example, in a flat plate lithium battery that includes a plurality of positive and negative electrodes, lithium plating may occur at relatively high current density regions (e.g., near the four edges of the negative electrodes). To compensate for this tendency, conventional batteries are designed such that the negative electrodes (or the active material provided thereon) extend beyond the ends of the positive electrodes (or the active material provided thereon) in all directions by an amount sufficient to compensate for variations in the winding/assembly process (e.g., by an amount up to 1 millimeter or more).

FIGS. 1-2 illustrate a portion of a battery 100 that includes a plurality of negative electrodes 110 (which include a current collector 112 and active material 114 provided thereon), a plurality of positive electrodes 120 (which include a current collector 122 and active material 124 provided thereon), and separators 130 and electrolyte between the positive and negative electrodes. Although shown as being coextensive with the active material 114 in FIG. 1, the separator(s) may be provided such that it extends beyond the edge of the adjacent electrode to prevent shorting between adjacent electrodes (i.e., the separator may extend above and below the edge of the active material 114 shown in FIG. 1). The portion of the active material 114 that extends beyond the positive electrodes 120 is thus used to compensate for the tendency to plate lithium. The extent to which the negative electrodes extend beyond the edges of the positive electrodes (shown by arrows A-A and B-B in FIG. 2) may be up to one millimeter (mm) or more.

A similar design rule is used in the context of wound (e.g., jellyroll style) lithium batteries, as shown in FIGS. 3-4. As illustrated, a wound electrode battery 200 includes a negative electrode 210 (which includes a current collector 212 and active material 214 provided thereon) and a positive electrode 220 (which includes a current collector 222 and active material 224 provided thereon). Separators 230 are provided between the positive and negative electrodes. As illustrated in FIGS. 3-4, the top and bottom edges of the negative electrode 210 extend beyond the edges of the positive electrode 220 by a distance C that may be up to one millimeter or more. Additionally, because a leading edge 211 of the negative electrode is also a potential location where plating might occur, the leading edge 211 of the negative electrode 210 extends a distance D (e.g., up to one millimeter or more) beyond a leading edge 221 of the positive electrode 220.

In cases where an accordion-style fold (also referred to as a ""Z fold"" or a ""zigzag"" fold) is used for the electrodes, multiple design rules may be employed to mitigate lithium plating. For example, the top and bottom edges of the negative electrodes may extend beyond those of the positive electrodes in a manner similar to that described above with respect to wound electrodes. Accordian-style folding of the electrodes also provides an additional area of potential concern, however. FIG. 5 illustrates a battery 300 having an electrode set 302 that is folded accordion-style. The electrode set 302 includes a negative electrode 310 (which includes a current collector 312 and active material 314 provided thereon), a separator 330, and a positive electrode 320 (which includes a"

current collector 322 and active material 324 provided thereon). Because of the manner in which the electrode set 302 is folded, at certain localized areas within the battery 300, there will be a greater amount of positive active material than negative active material. One such area is shown in FIG. 5, where the positive electrode 320 is outside the negative electrode 310 at a fold. Because there is more positive active material in this region than negative active material (owing to the larger radius, and hence greater surface area, of the positive electrode in this area), the negative active material would be unable to take in all of the cyclable lithium provided by the positive active material in this area unless steps are taken to mitigate against such a circumstance. As shown in FIG. 5, one possible solution is to mask the positive current collector 322 such that no positive active material 324 is provided in this region (denoted with reference numeral 326). One difficulty with such a solution is that it is relatively complicated to accurately mask regions on the electrodes to ensure that they will line up appropriately at locations of the folds.

Another potential solution for accordion-style folded electrodes is shown in FIG. 6, which shows a portion of a battery 400 having a folded negative electrode 410 (which includes a current collector 412 and active material 414 provided thereon) with positive electrode plates 420 (which includes a current collector 422 and active material 424 provided thereon). Separators 430 are provided between the positive and negative electrodes. By providing positive plates 420 interspersed within the folded electrode arrangement, there is additional negative active material near each of the rounded folded portions of the negative electrode 410 to take in any excess lithium from the positive active material 424.

Each of the various configurations described above suffers from various drawbacks. For example, each of the above-described configurations utilizes a larger negative electrode as compared to the positive electrode (with an associated amount of additional active material provided thereon), which increases the overall size of the battery and results in an increased materials cost. Additionally, each of these configurations requires careful alignment of the various components to ensure that the negative active material is properly positioned such that it will absorb excess lithium from the positive material, which complicates manufacturing processes and introduces increased labor and equipment costs. In certain cases, negative electrodes may be made even larger than are necessary to absorb the excess lithium in order to compensate for potential variability in manufacturing processes which may result in slight misalignments of the electrodes. Further still, the use of excess electrode area and active material results in batteries having lower energy density than might otherwise be obtained, since the excess electrode area does not fully contribute to the capacity of the battery.

SUMMARY

An exemplary embodiment relates to a lithium-ion battery that includes a plurality of generally planar positive and negative electrodes arranged in alternating fashion to form an electrode stack. Each of the electrodes includes a current collector having two opposed surfaces and an active material provided on at least one of the two opposed surfaces. The active material of the negative electrodes has a potential that is greater than 0.2 volts versus a reference electrode. The area of the current collectors of the negative electrodes covered by active material is not larger than the area of the current collectors of the positive electrodes covered by active material.

Another exemplary embodiment relates to a lithium-ion battery that includes an element comprising a plurality of alternating generally planar positive and negative electrodes each having a plurality of edges. The negative electrodes comprise an active material having a potential that is greater than 0.2 volts versus a reference electrode. The element comprises at least one edge region that comprises edges of the positive electrodes and edges of the negative electrodes. The active material provided on the negative electrodes does not extend beyond the edges of the positive electrodes in the edge region.

Another exemplary embodiment relates to a lithium-ion battery that includes a plurality of alternating positive and negative electrodes, the positive and negative electrodes having a generally planar rectangular configuration and comprising a current collector with two opposed surfaces, at least a portion of at least one of the two opposed surfaces for each of the electrodes having an active material provided thereon. The active material provided on the negative electrodes has a potential that is greater than 0.2 volts versus a reference electrode. For at least a plurality of the negative electrodes, the area of the active material is not larger than the area of the active material on an adjacent positive electrode.

DETAILED DESCRIPTION

Figure 1:
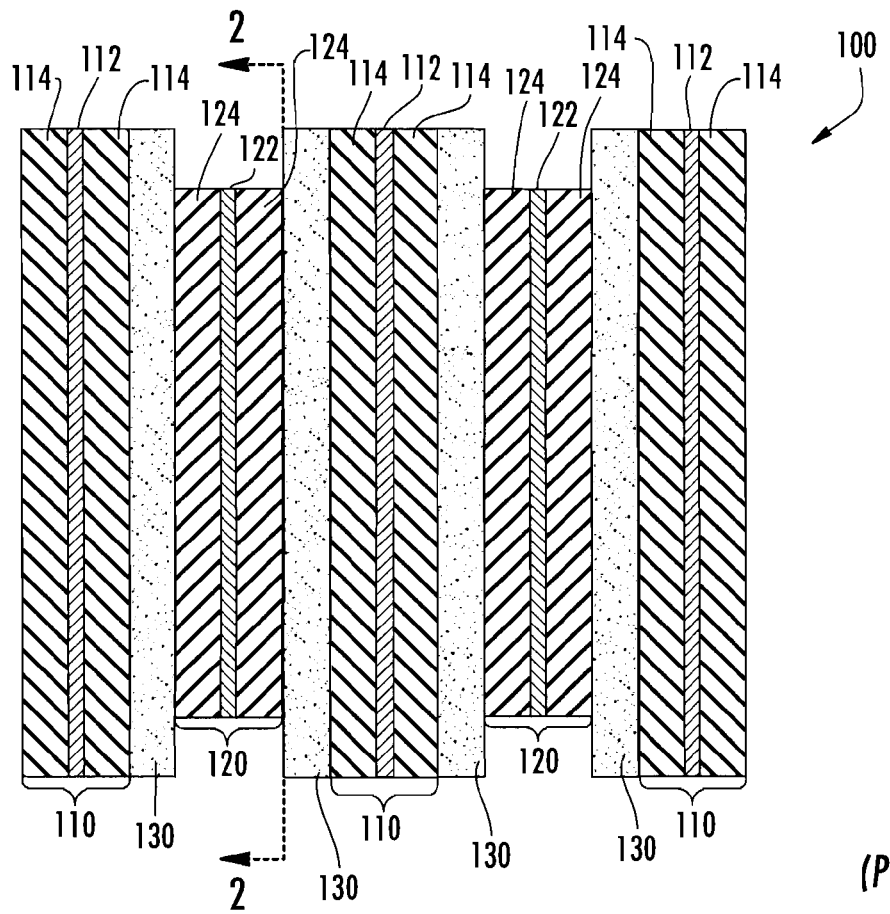
FIG. 1 is a cross-sectional view of a portion of a prior art lithium-ion battery having flat plate electrodes.

According to an exemplary embodiment, a lithium-ion battery utilizes a negative active material that is configured to provide enhanced flexibility in the physical design of the battery. For example, the use of certain materials may allow for the elimination of relatively complicated and expensive design rules which are intended to prevent lithium plating at the negative electrode. Various advantages may be obtained from eliminating such design rules, including, for example, better overall energy density for the batteries, simpler and more inexpensive manufacturing processes, material reduction and cost savings, and the like.

According to various exemplary embodiments as will be described in greater detail below, a lithium-ion battery includes a housing (e.g., a can, case, casing, etc.) in which one or more positive electrodes, one or more negative electrodes, and an electrolyte is provided. One or more separators made from a porous polymer or other suitable material may also be provided intermediate or between the positive and negative electrodes to prevent direct contact between adjacent electrodes. The positive and negative electrodes each include a current collector and an active material provided on one or more sides thereof.

According to an exemplary embodiment, the battery housing is made of stainless steel or another metal (e.g., titanium or titanium alloys, aluminum or aluminum alloys, etc.). According to other exemplary embodiments, the battery housing may be made of a plastic material or a plastic-foil laminate material (e.g., an aluminum foil provided intermediate a polyolefin layer and a polyester layer).

Any suitable electrolyte may be used depending on desired performance characteristics of the battery and other factors. According to various exemplary embodiments, the electrolyte may be a lithium salt dissolved in one or more non-aqueous solvents, a lithium salt dissolved in a polymeric material such as poly(ethylene oxide) or silicone, a solid state electrolyte such as a lithium-ion conducting glass, or an ionic liquid such as an N-methyl-N-alkylpyrrolidinium bis(trifluoromethanesulfonyl)imide salt.

According to one exemplary embodiment, the electrolyte is a 3:7 mixture of ethylene carbonate to ethylmethyl carbonate (EC:EMC) in a 1.0 M salt of $LiPF_6$. According to another particular exemplary embodiment, the electrolyte includes a polypropylene carbonate solvent and a lithium bis-oxalatoborate salt (sometimes referred to as LiBOB). According to other exemplary embodiments, the electrolyte may comprise one or more of a PVDF copolymer, a PVDF-polyimide material, and organosilicon polymer, a thermal polymerization gel, a radiation cured acrylate, a particulate with polymer gel, an inorganic gel polymer electrolyte, an inorganic gel-polymer electrolyte, a PVDF gel, polyethylene oxide (PEO), a glass ceramic electrolyte, phosphate glasses, lithium conducting glasses, lithium conducting ceramics, and an inorganic ionic liquid or gel, among others.

According to an exemplary embodiment, the separator is a polymeric material such as a polypropylene/polyethelene copolymer or another polyolefin multilayer laminate that includes micropores formed therein to allow electrolyte and lithium ions to flow from one side of the separator to the other. The thickness of the separator is between approximately 10 micrometers (μm) and 50 μm according to an exemplary embodiment. According to a particular exemplary embodiment, the thickness of the separator is approximately 25 μm and the average pore size of the separator is between approximately 0.02 μm and 0.1 μm.

The positive electrode(s) include a current collector made of a conductive material such as a metal. According to an exemplary embodiment, the positive current collector is formed from aluminum or an aluminum alloy, and may be provided as a thin foil, a grid (e.g., a mesh grid, an expanded metal grid, a photochemically etched grid, etc.), or any other suitable configuration. The current collector may also have an electrically conductive member or element (e.g., a tab) coupled thereto and extending therefrom. The tab may be formed from aluminum or an aluminum alloy (or any other suitable material), and may serve as a terminal for the battery according to an exemplary embodiment.

The positive current collector has a layer of active material provided on one or both sides thereof. The active material layer provided on the positive current collector (hereinafter referred to as the "positive active material") may be made up of a single active material or may include multiple active materials (either provided as separate layers or intermixed). The positive active material may also include a binder material that includes a material such as polyvinylidine fluoride (PVDF) and/or an elastomeric polymer such as styrene butadiene rubber (SBR) (carboxymethylcellulose may be provided by itself with a water solvent or may be provided in conjunction with the SBR). The positive active material may also include a conductive additive such as carbon black.

According to an exemplary embodiment, the positive active material is a material or compound that includes lithium that may be doped and undoped during discharging and charging of the battery. The positive active material may include any one or more of the following materials: lithium cobalt oxide ($LiCoO_2$); lithium manganese oxide ($LiMn_2O_4$); $LiCo_xNi_{(1-x)}O_2$ ($0.05 \leq x \leq 0.8$); $LiAl_xCo_yNi_{(1-x-y)}O_2$ ($0.05 \leq x \leq 0.3$, $0.1 \leq y \leq 0.3$); $LiM_x'M_{1-x}''O_2$ (where M' and M" are metals such as Co, Ni, Mn, Fe, Cr, V, Zn, Al, Cd, and mixtures thereof); $Li_{1-x}MO_2$ (where M is a metal such as cobalt, nickel, or manganese and $0 \leq x \leq 0.5$); $LiM'_xM''_{1-x}PO_4$ (where $0 \leq x \leq 1$ and M' and M" =Fe, Co, Ni, Mn, Cu, V. Ti, Cr, Zn, Cd, and mixtures thereof); and any other suitable active material such as those described in U.S. patent application Ser. No. 10/978,712 filed Oct. 29, 2004, the entire disclosure of which is incorporated herein by reference. According to a particular exemplary embodiment, the positive active material includes lithium cobalt oxide.

The thickness of the positive active material may differ according to various exemplary embodiments. According to one exemplary embodiment, the thickness of the positive active material is between approximately 0.1 μm and 3 mm. According to another exemplary embodiment, the thickness of the positive active material is between approximately 25 μm and 300 μm. According to a particular exemplary embodiment, the thickness of the positive active material is approximately 75 μm.

The negative electrode(s) includes a current collector made of a conductive material such as a metal. According to an exemplary embodiment, the negative current collector is formed from copper, titanium, nickel, aluminum, or alloys thereof, and may be provided as a thin foil, a grid (e.g., a mesh grid, an expanded metal grid, a photochemically etched grid, etc.), or any other suitable configuration. The negative current collector may also have an electrically conductive member or element (e.g., a tab) coupled thereto and extending therefrom. The tab may be formed from nickel or a nickel alloy, vanadium or a vanadium alloy, or any other suitable material, and may serve as a terminal for the battery according to an exemplary embodiment. According to a particular exemplary embodiment, the tab may couple the negative current collector to the battery housing.

The negative current collector has a layer of active material provided on one or both sides thereof. The active material layer provided on the negative current collector (hereinafter referred to as the "negative active material") may be made up of a single active material or may include multiple active materials (either provided as separate layers or intermixed). The positive active material may also include a binder material (e.g., polyvinylidine fluoride (PVDF) or an elastomeric polymer) and/or a conductive additive such as carbon black, graphite, or a mixture thereof.

According to an exemplary embodiment, the negative active material is selected such that it has an average potential that is greater or equal to approximately 0.2 V versus Li/Li$^+$ (e.g., according to one particular exemplary embodiment, the negative active material has an average potential that is greater or equal to approximately 0.3 V versus Li/Li$^+$; according to a particularly preferred embodiment, the negative active material is a titanate material having an average potential that is greater or equal to approximately 1.5 V versus Li/Li$^+$). The inventors have unexpectedly discovered that the use of negative electrode materials that possess a relatively high average potential versus Li/Li$^+$ reduces the likelihood of lithium plating. According to one exemplary embodiment, such a negative active material is used in conjunction with a positive active material that has an average potential of greater than approximately 3 V versus Li/Li$^+$ (e.g., LiCoO$_2$).

According to an exemplary embodiment, the negative active material is a lithium titanate material such as Li$_4$Ti$_5$O$_{12}$ (referred to alternatively as Li$_{4/3}$Ti$_{5/3}$O$_4$) having a spinel structure. Other lithium titanate materials which may be suitable for use as the negative active material may include one or more of the following lithium titanate materials: LiTi$_2$O$_4$, Li$_2$TiO$_3$, Li$_x$Ti$_y$O$_4$ (where $1.0 \leq x \leq 1.6$ and $1.6 \leq y \leq 2.0$), Li$_4$M$_x$Ti$_{5-x}$O$_{12}$ (where $0 \leq x \leq 1.0$ and M is a metal such as vanadium, iron, aluminum, nickel, cobalt, copper, chromium, molybdenum, niobium or combinations thereof) and LiM'M''XO$_4$ (where M' is a metal such as nickel, cobalt, iron, manganese, vanadium, copper, chromium, molybdenum, niobium, or combinations thereof, M'' is an optional three valent non-transition metal, and X is zirconium, titanium, or a combination of these two). Note that such lithium titanate materials may be used in any state of lithiation (e.g., Li$_{4+x}$Ti$_5$O$_{12}$, where $0 \leq x \leq 3$).

One advantage of using a lithium titanate material instead of a carbonaceous material is that it is believed that the use of a lithium titanate material allows for charging and discharging of the battery at higher rates than is capable using carbonaceous materials. Lithium titanate materials are also believed to offer superior cycle life because they are so called "zero-strain" materials. Zero strain materials have crystal lattices which do not experience shrinkage or contraction with lithium doping/de-doping, making them free from strain-related degradation mechanisms.

Another advantageous feature of using a lithium titanate material is that it is believed that when used in a negative electrode of a lithium-ion battery, such materials will cycle lithium at a potential plateau of about 1.5 V versus a lithium reference electrode. This is substantially higher than graphitic carbon, which is traditionally used in lithium ion batteries, and cycles lithium down to about 0.1 V in the fully charged state. As a result, the battery using lithium titanate is believed to be less likely to result in lithium plating during charging.

Being free from the risk lithium plating, cells with lithium titanate negative electrodes may also be charged at rates that exceed those with carbon negative electrodes. For example, a common upper limit for the rate of charge in lithium ion batteries is about 1 C (meaning that the battery can be fully charged from the discharged state in one hour). Conversely, it has been reported in literature that lithium titanate may be charged at rates up to 10 C (i.e., attaining full charge in 1/10 hour, or six minutes). Being able to recharge a battery more quickly substantially increases the functionality of devices that employ such a battery. A further advantage of the higher potential of the lithium titanate material is that it avoids decomposition of organic solvents (such as propylene carbonate) commonly used in lithium ion batteries. In so doing, it may reduce negative consequences such as formation of gas, cell swelling, reduction of reversible battery capacity, and buildup of resistive films which reduce battery power.

Other materials having cycling potentials that exceed that of lithium by several hundred millivolts and which may be suitable for use as the negative active material include the materials listed in Table 1. Such materials may be used alone or in combination with the lithium titanates described above and/or any of the other materials listed in Table 1.

TABLE 1

| | | Cycling Potentials (vs Li) | | |
|---|---|---|---|---|
| Class | Compound | Vmin | Vmax | Vavg |
| Oxides | TiO$_2$ (Anatase) | 1.4 | 2 | 1.80 |
| Oxides | WO$_2$ | 0.6 | 1.3 | 0.80 |
| Oxides | WO$_3$ | 0.5 | 2.6 | 1.0 |
| Oxides | MoO$_2$ | 1.3 | 2 | 1.60 |
| Oxides | Nb$_2$O$_5$ | 1.0 | 2 | 1.50 |
| Oxides | LiWO$_2$ | | | 0.75 |
| Oxides | Li$_x$MoO$_2$ | 0.8 | 2 | 1.60 |
| Oxides | V$_6$O$_{13}$ | | | 2.30 |
| Oxides | Li$_6$Fe$_2$O$_3$ | | | 0.75 |
| Oxides | LiFeO$_2$ | 1.0 | 3.0 | 2.0 |
| Oxides | Fe$_2$O$_3$ | 0.2 | 2.0 | 0.75 |
| Oxides | MO where M = Co, Ni, Cu or Fe | | | 0.8-1.5 |
| Sulfides | FeS$_2$ | 1.3 | 1.9 | 1.65 |
| Sulfides | MoS$_2$ | | | 1.75 |
| Sulfides | TiS$_2$ | | | 2.00 |
| Alloys | Sn—Bi | | | 0.75 |
| Alloys | Alloys comprising of Al, Si or Sn and other elements | | | 0.30 |
| Alloys | Sn—Co—C | | | 0.30 |
| Alloys | Sb | | | 0.90 |
| Alloys | NbSe$_3$ | | | 1.95 |
| Alloys | Bi | | | 0.80 |
| Alloys | In | | | 0.60 |
| Alloys | Li$x$Al | | | 0.36 |
| Alloys | Li$x$Sn | 0 | 1.3 | 0.50 |
| Alloys | Sn—Sb | | | 0.0-1.0 |
| Polymers | Poly(phenylquinoline) | | | 1.50 |
| Polymers | Polyparaphenylene | | | 0.70 |
| Polymers | Polyacetylene | | | 1.00 |
| Vanadates | Li$_x$MVO$_4$ where M = Ni, Co, Cd, Zn | | | 2.0-0.5 |

According to a particular exemplary embodiment, a negative active material such as Li$_4$Ti$_5$O$_{12}$ is coated on an aluminum foil using a conductive carbon filler and a PVDF, NMP (Polyvinylidene fluoride, N-methylpyrrolidone) binder solution. The binder may also include (in addition to or in place of the foregoing materials) an elastomeric polymer such as styrene butadiene rubber (SBR) (carboxymethylcellulose may be provided by itself with a water solvent or may be provided in conjunction with the SBR). The negative electrode coatings are made using the negative electrode material, the conductive carbon and the binder solution.

According to various exemplary embodiments, the thickness of the negative active material is between approximately 0.1 μm and 3 mm. According to other exemplary embodiments, the thickness of the active material may be between approximately 25 μm and 300 μm. According to another exemplary embodiment, the thickness of the active material may be between approximately 20 μm and 90 μm, and according to a particular exemplary embodiment, approximately 75 μm.

According to an exemplary embodiment, negative active materials such as those described above may allow for more flexible design rules to be employed in the design and manufacture of lithium-ion batteries. For example, because the use of a lithium titanate material reduces the risk of lithium plating at the negative electrode, lithium-ion battery designs may be modified such that the edges of the negative electrodes need not extend beyond the edges of the positive electrodes at all locations within the battery. This in turn allows for a reduction in negative electrode area (relative to the positive electrode area) and potentially improved energy density, while still providing protection against lithium plating.

It should be understood by those reviewing the present application that with respect to the various exemplary embodiments described herein, it is contemplated by the inventors that the need to provide excess negative active material in high current regions (e.g., edges of electrodes) may be eliminated using higher potential negative active materials. Where references are made to providing negative electrodes that have electrode edges that are coextensive (or which do not extend as far as) the adjacent edges of the positive electrodes, it should also be understood that similar advantages may be obtained by providing negative electrodes having negative active materials that are coextensive (or which does not extend as far as) the positive active material on the adjacent positive electrode (e.g., where the negative active material and/or positive active material are not coated to the edge of their respective electrodes). Examples of such configurations are provided in FIGS. 12-15 and described below. Further, because there is necessarily some variability in the battery assembly process that may cause electrodes to shift during the assembly process relative to each other, references to negative electrodes and/or negative active materials not extending as far as the positive electrodes and/or positive active materials should be interpreted to mean that the negative electrodes and/or negative active materials do not extend as far as the positive electrodes and/or positive active materials for all or a portion of the relevant area (e.g., a statement that the negative active material does not extend as far as the positive active material toward the top edge of a wound cell element should be interpreted to mean that the negative active material does not extend as far as the positive active material along at least a portion of the top edge of the wound cell element).

Figure 7:
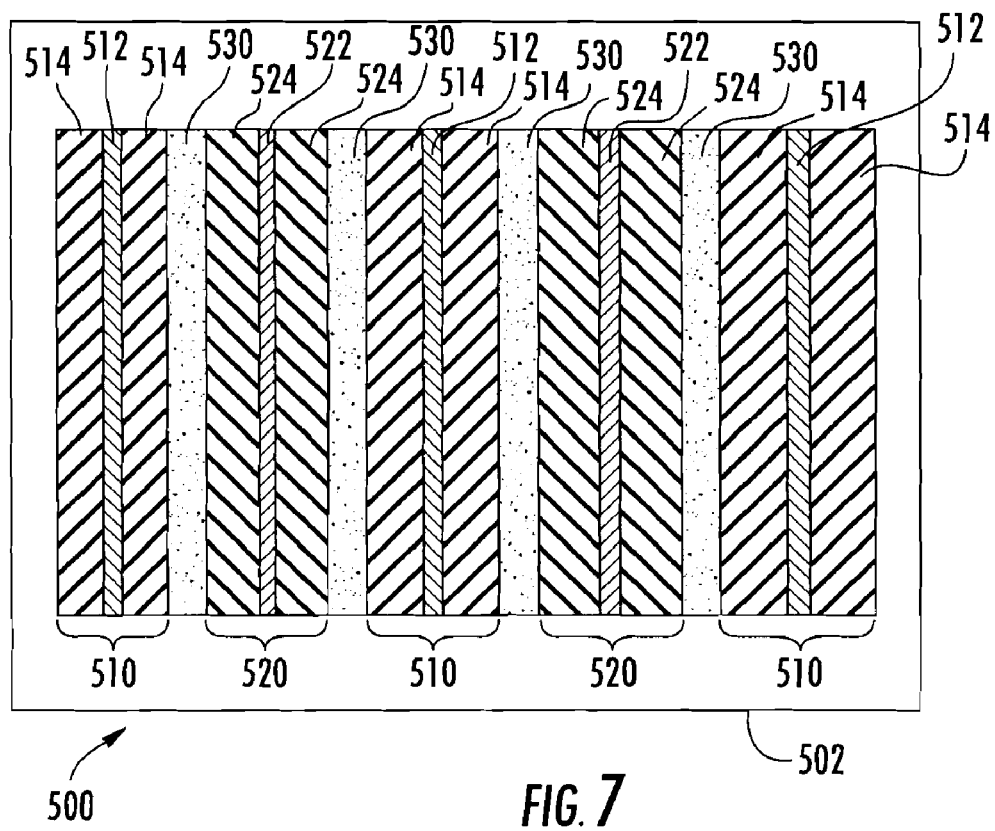
FIG. 7 is a cross-sectional view of a portion of a lithium-ion battery having flat plate electrodes according to an exemplary embodiment.
Figure 8:
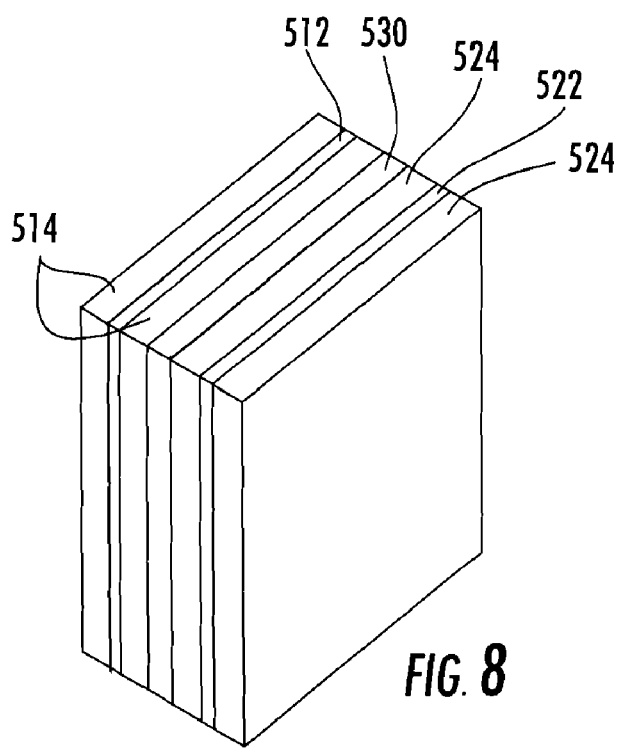
FIG. 8 is a perspective view of a portion of the battery shown in FIG. 7.

For example, FIG. 7 is a cross-sectional view of a portion of a lithium-ion battery 500 having flat plate electrodes having a generally rectangular (e.g., a square) geometry according to an exemplary embodiment, and FIG. 8 is a perspective view of a portion of the battery 500. The battery 500 includes a housing or casing 502 (e.g., a can) that may be made of any suitable material as described above. The battery 500 includes a plurality of generally planar negative electrodes 510 and positive electrodes 520, with separators 530 provided between the positive and negative electrodes. The negative electrodes 510 include current collectors 512 and an active material 514 provided on one or both sides thereof, and the positive electrodes 520 include current collectors 522 and an active material 524 provided on one or both sides thereof. Although illustrated as having a generally rectangular planar configuration, according to other exemplary embodiments, the electrodes may be circular or may have other suitable shapes.

Figure 2:
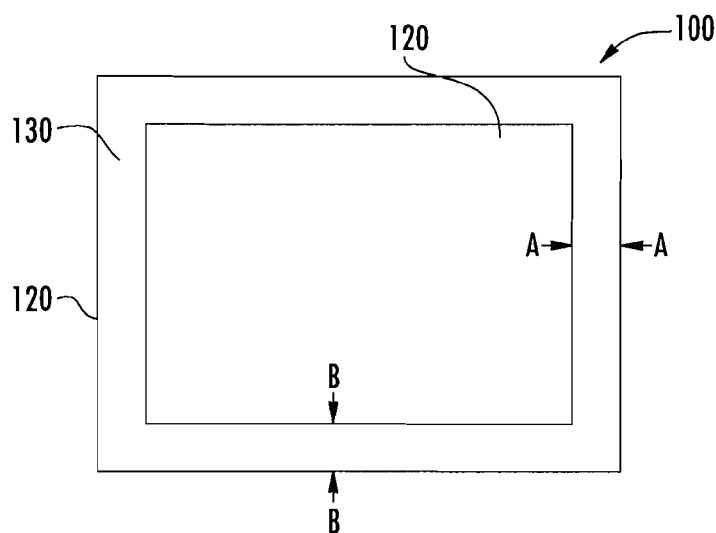
FIG. 2 is a cross-sectional view of the battery shown in FIG. 1 taken along line 2-2.
Figure 3:
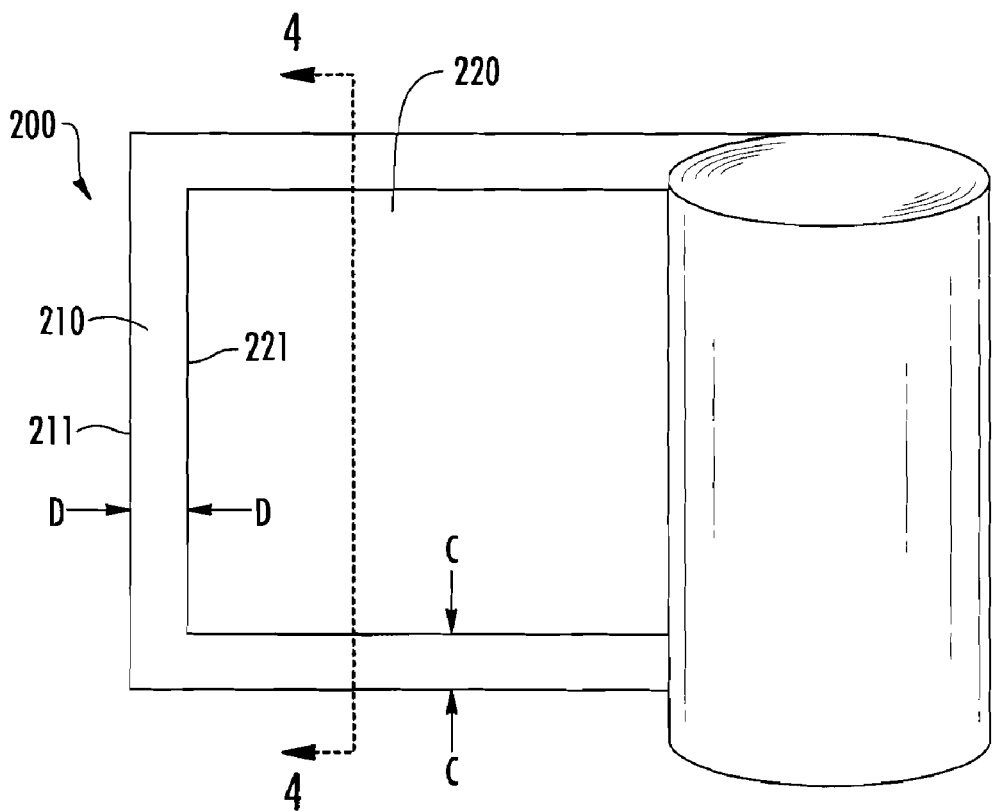
FIG. 3 is an isometric view of a portion of a prior art lithium-ion battery having wound electrodes.
Figure 4:
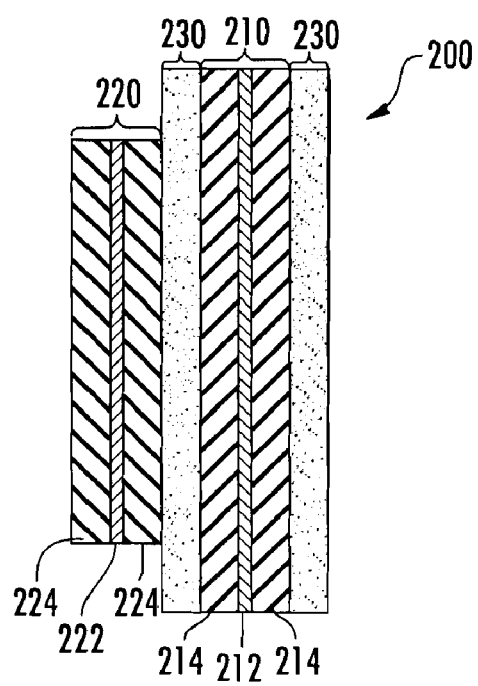
FIG. 4 is a cross-sectional view of the battery shown in FIG. 3 taken along line 4-4.

As illustrated in FIGS. 7-8, the negative electrodes 510 do not extend beyond the edges of the positive electrodes 520 along their outer perimeter (as they do, for instance, in the batteries illustrated in FIGS. 1-2). According to an exemplary embodiment, the negative electrodes 510 have the same area as the positive electrodes 520 (i.e., the top, bottom, and side edges are coextensive or coterminous) and the active materials 514, 524 on both the negative electrodes 510 and positive electrodes 520 extend to the ends of their respective current collectors 512, 522. According to one exemplary embodiment, the active material provided on the negative electrode does not extend beyond the active material provided on the positive electrode near at least one of the edges of the electrodes. According to another exemplary embodiment, the area of the active material provided on the negative electrode is less than or equal to the area of the active material provided on the positive electrode.

Figure 9:
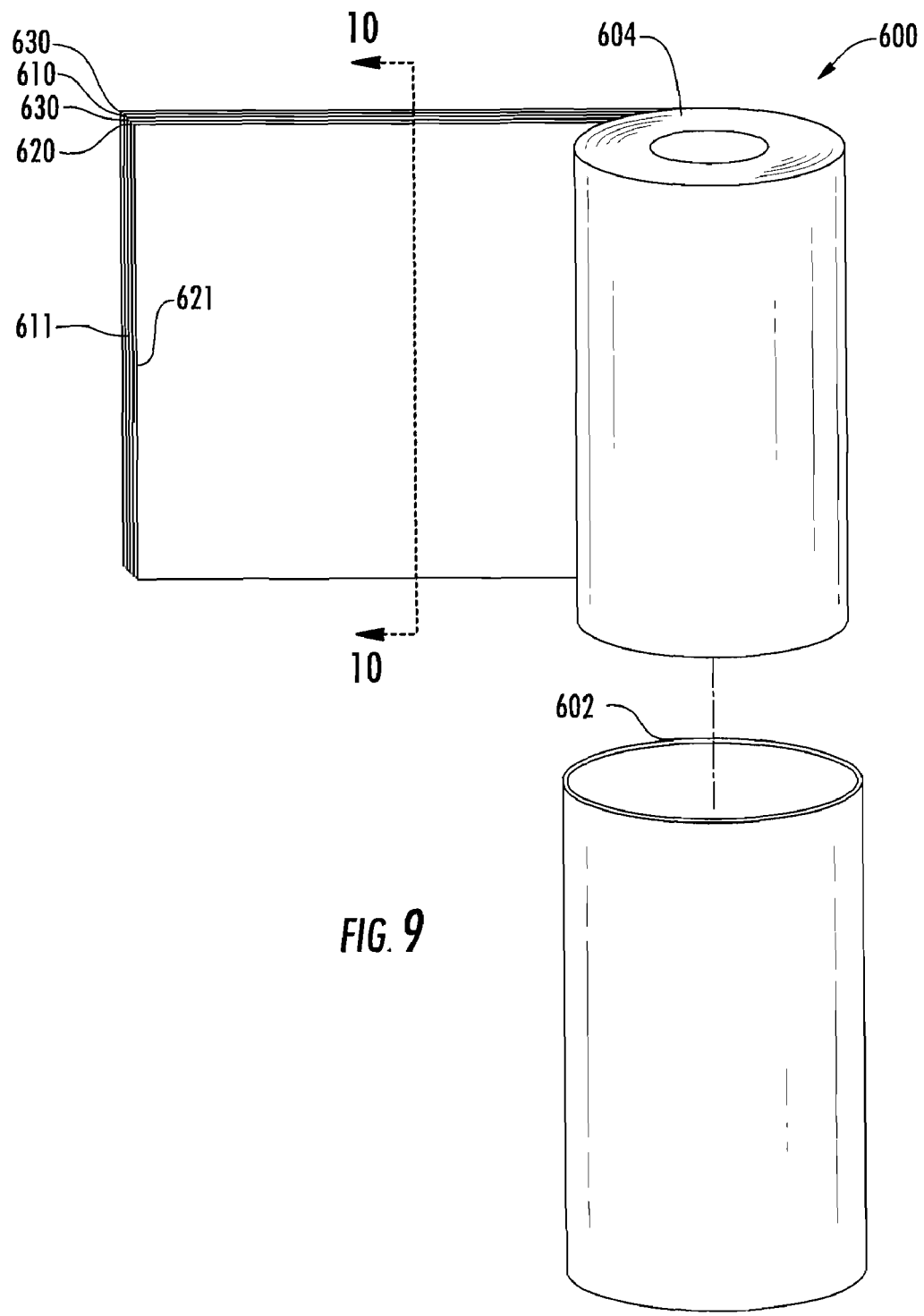
FIG. 9 is an isometric view of a lithium-ion battery having a wound electrode configuration according to an exemplary embodiment.
Figure 10:
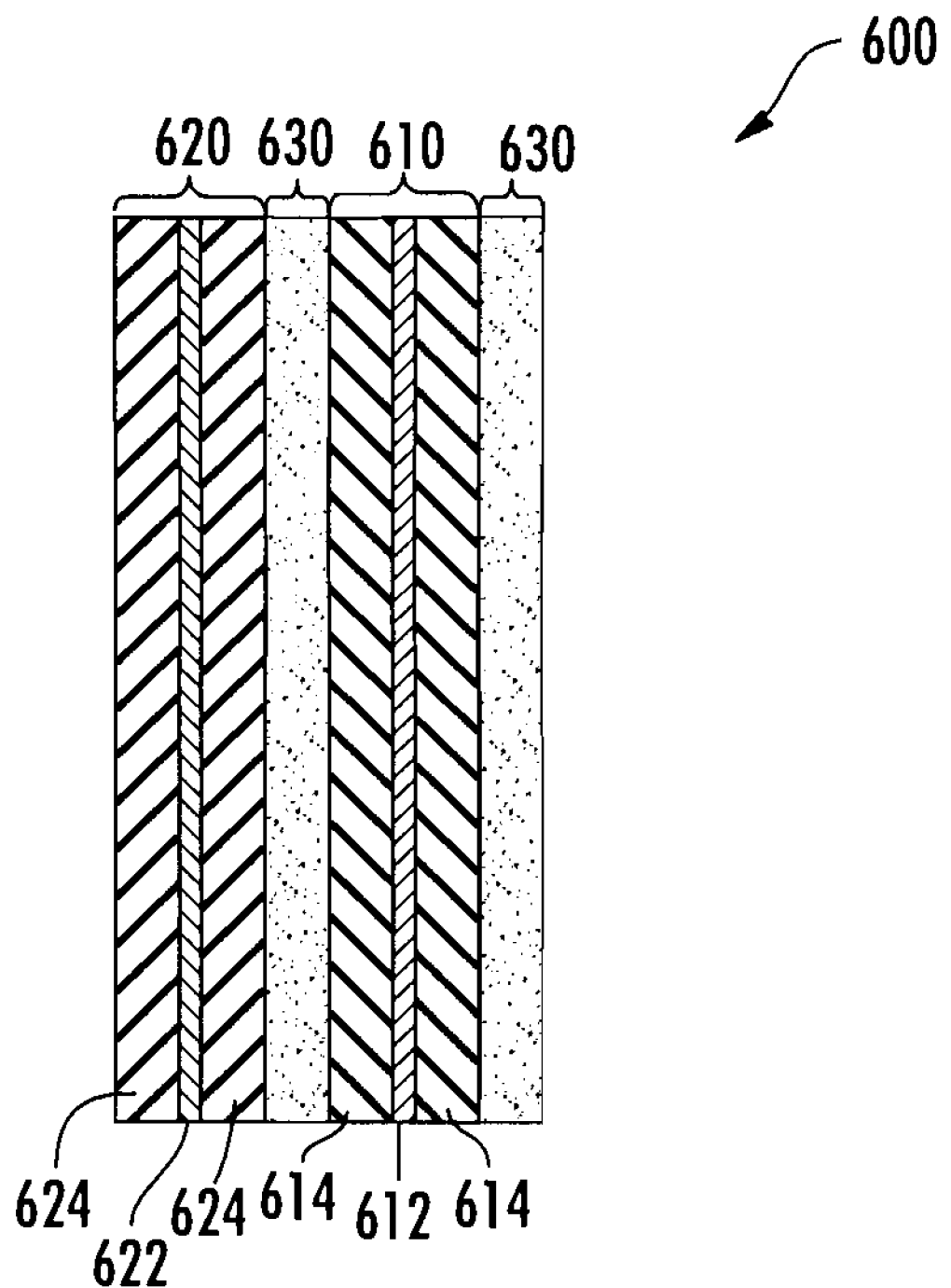
FIG. 10 is a cross-sectional view of a portion of the battery shown in FIG. 9.

FIGS. 9-10 illustrate a lithium-ion battery 600 having a wound electrode configuration according to an exemplary embodiment. The battery 600 includes a housing or casing 602 (e.g., a can) in which the wound cell element 604 is provided during assembly. As shown in FIG. 9, the element 604 is partially unwound to illustrate the components of the element.

The battery 600 includes a negative electrode 610 and positive electrode 620, with separators 630 provided between the positive and negative electrodes (according to an exemplary embodiment, two separators are utilized so that when the electrodes are wound, the positive and negative electrodes do not come into direct contact at any point, which may result in battery shorting). The negative electrode 610 includes a current collector 612 and an active material 614 provided thereon, and the positive electrode 620 includes a current collector 622 and an active material 624 provided thereon.

It should be noted that while the exemplary embodiment shown in FIG. 9 illustrates a battery in which the electrodes are wound to form a generally cylindrical cell element, other configurations may also be possible for wound or wrapped electrode batteries. For example, the shape of the cell element may be that of an oval or elongated flattened winding (e.g., having a generally rectangular winding with rounded corners) according to other exemplary embodiments. A mandrel or other structure may be used to define the shape which the cell element may take (e.g., by wrapping the electrodes around the mandrel).

As shown in FIGS. 9-10, the height of the negative and positive electrodes are substantially equal. That is, the top and bottom edges of the negative electrode 610 do not extend beyond the top and bottom edges of the positive electrode 620. According to an exemplary embodiment, the top and bottom edges of the positive and negative electrodes are coextensive or coterminous. As also shown in FIGS. 9-10, the leading edges 621, 611 of the positive and negative electrodes are substantially coextensive or coterminous (i.e., the leading edge 611 of the negative electrode 610 does not extend beyond that of the positive electrode 620).

Figure 11:
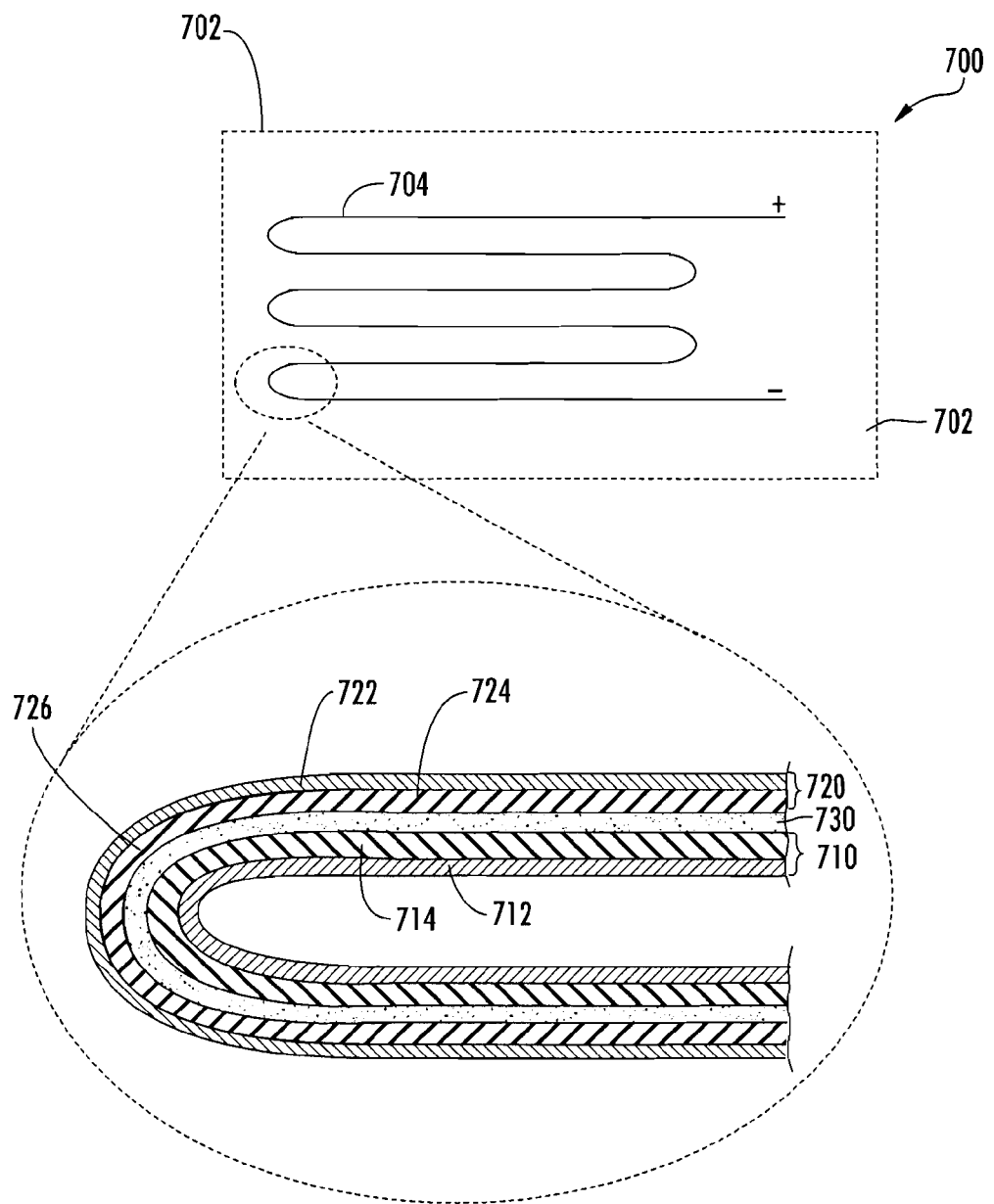
FIG. 11 is a cross-sectional view of a lithium-ion battery having accordion-style electrodes.

FIG. 11 is a cross-sectional view of a lithium-ion battery 700 having an accordion-style electrode configuration (also referred to as a "Z fold" or a "zigzag" fold configuration) according to an exemplary embodiment. The battery 700 includes a housing or casing 702 (e.g., a can) in which a folded electrode set 704 is provided during assembly.

The battery 700 includes a negative electrode 710 and positive electrode 720, with a separator 730 provided between the positive and negative electrodes. The negative electrode 710 includes a current collector 712 and an active material 714 provided on one or both sides thereof, and the positive electrode 720 includes a current collector 722 and an active material 724 provided on one or both sides thereof.

Figure 5:
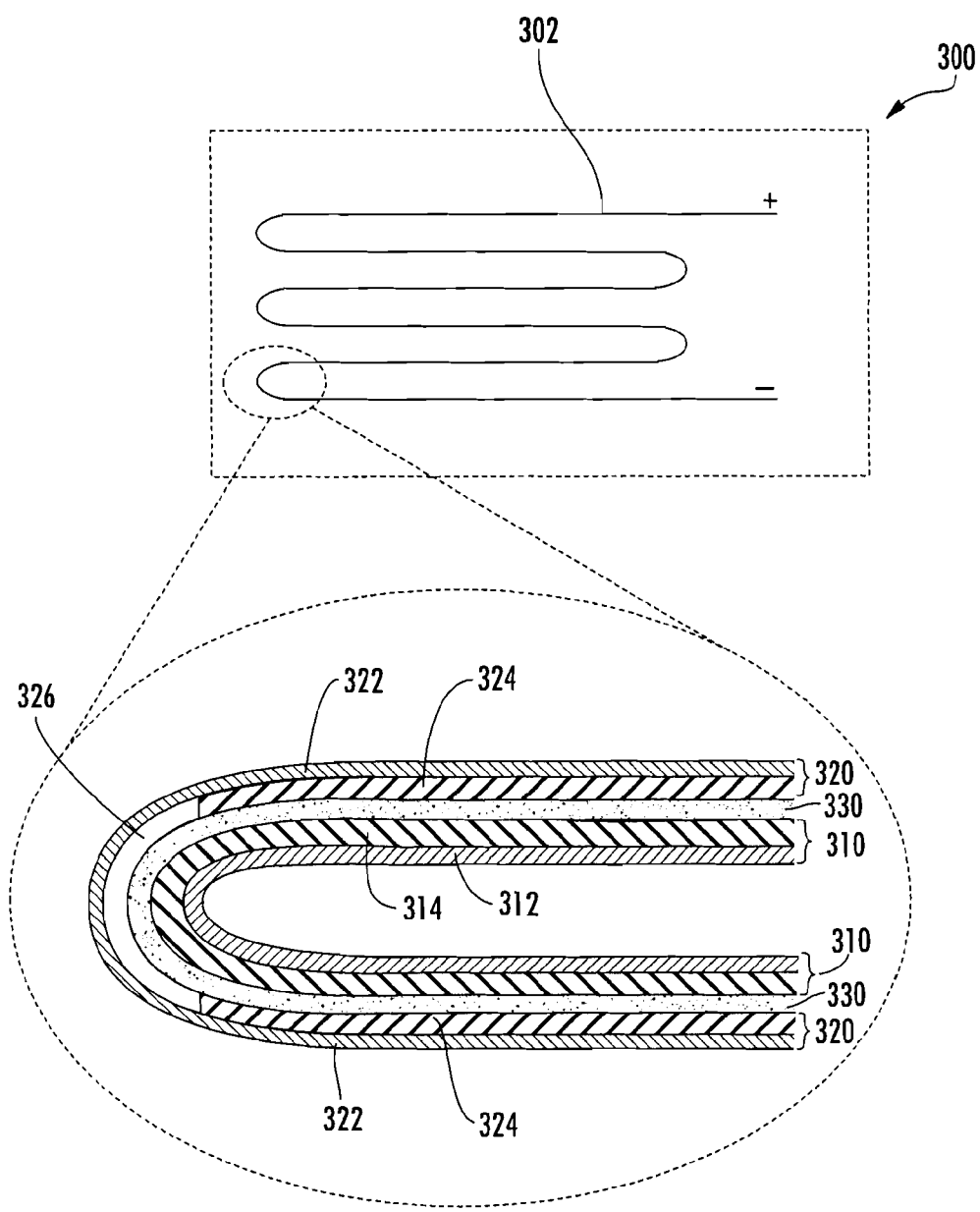
FIG. 5 is a cross-sectional view of a prior art lithium-ion battery having accordion-style electrodes.
Figure 6:
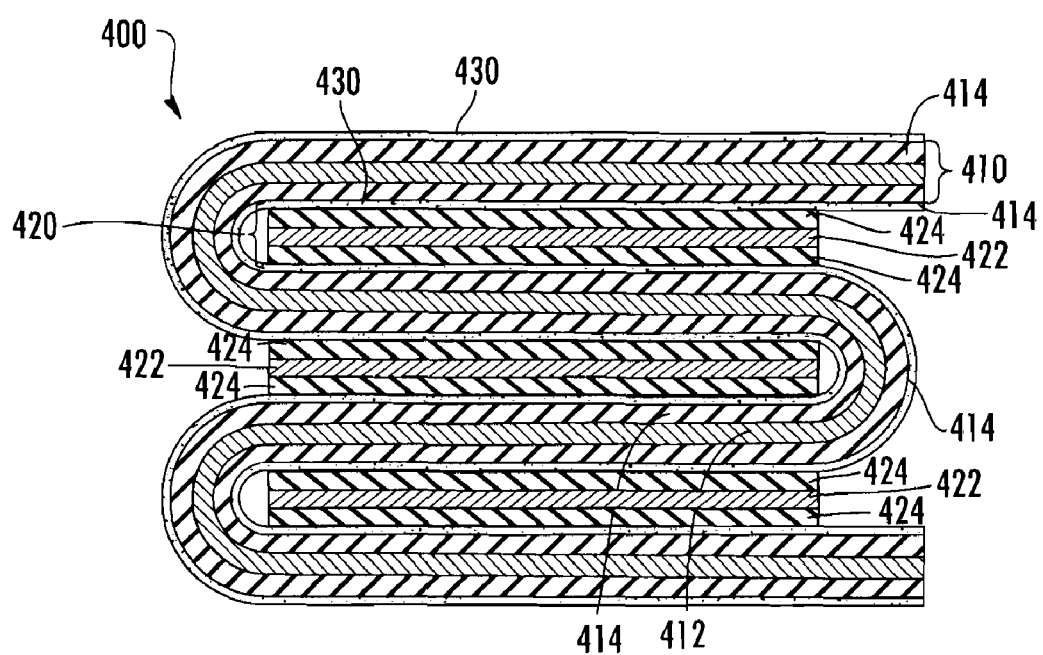
FIG. 6 is a cross-sectional view of a prior art lithium-ion battery having an accordion-style negative electrode with positive electrode plates interspersed between the folds of the negative electrode.

As illustrated in FIG. 11, the positive active material 724 may be applied along substantially the entire length of the positive electrode 720, without the need to mask a portion of the current collector 720 in the region 726 (see, e.g., FIG. 5, in which a portion of the current collector 322 is not coated with active material in a region 326). Additionally, the top and bottom edges of the positive electrode 720 and negative electrode 710 may be coextensive or coterminous (i.e., instead of the edge of the negative electrode 710 extending beyond that of the positive electrode).

While FIGS. 7-11 illustrate exemplary embodiments in which the edges of the positive and negative electrodes are substantially coextensive or coterminous, those reviewing this disclosure will appreciate that other possibilities may be possible. FIGS. 12-15 illustrate portions of lithium-ion batteries according to various other exemplary embodiments. It should be understood that the embodiments illustrated in FIGS. 12-15 may be applied to batteries of any of a variety of configurations (e.g., flat plate electrode, wound electrode, Z-fold electrode, etc.). To this end, the edges of the various electrodes shown in FIGS. 12-15 may be applied to top and bottom edges of electrodes, leading and trailing edges of wound batteries, and the like.

Figures 12, 13:
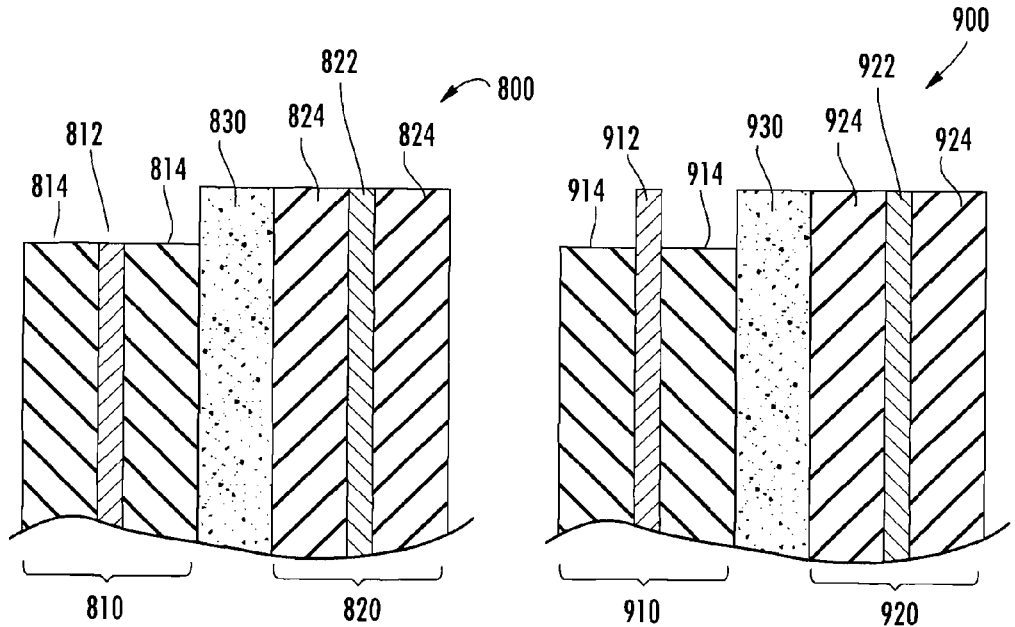
FIG. 12 is a cross-sectional view of a portion of a lithium-ion battery according to an exemplary embodiment.
FIG. 13 is a cross-sectional view of a portion of a lithium-ion battery according to an exemplary embodiment.

FIG. 12 is a cross-sectional view of a portion of a lithium-ion battery 800 that includes a negative electrodes 810, a positive electrode 820, and a separator 830 provided between the positive and negative electrodes. The negative electrode 810 includes a current collector 812 and an active material 814 provided thereon, and the positive electrode 820 includes a current collector 822 and an active material 824 provided thereon. As shown in FIG. 12, the edge of the positive electrode 820 extends beyond the edge of the negative electrode 810. According to an exemplary embodiment, the positive electrode 820 may extend beyond the edge of the negative electrode 810 by between approximately 0 and 5 millimeters.

FIG. 13 is a cross-sectional view of a portion of a lithium-ion battery 900 that includes a negative electrode 910, a positive electrode 920, and a separator 930 provided between the positive and negative electrodes. The negative electrode 910 includes a current collector 912 and an active material 914 provided thereon, and the positive electrode 920 includes a current collector 922 and an active material 924 provided thereon. As shown in FIG. 13, the edge of the negative current collector 912 is coextensive or coterminous with the edge of the positive electrode 920, while the negative active material 914 terminates before the edge of the negative current collector 912. According to an exemplary embodiment, the negative active material 914 terminates between approximately 0 and 5 millimeters before the edge of the negative current collector 912. Because it is the negative active material 914 that is responsible for intercalating lithium, it is thus possible to use negative current collectors that have the same dimensions as the positive current collectors while using less active material by not coating the negative material all the way to its edge. The amount of negative active material (e.g., the amount by which the active material terminates before the edge of the current collector) may be selected so that there is an adequate or optimal amount of negative active material to intercalate the active lithium in the battery without resulting in lithium plating at the edges of the electrodes.

Figures 14, 15:
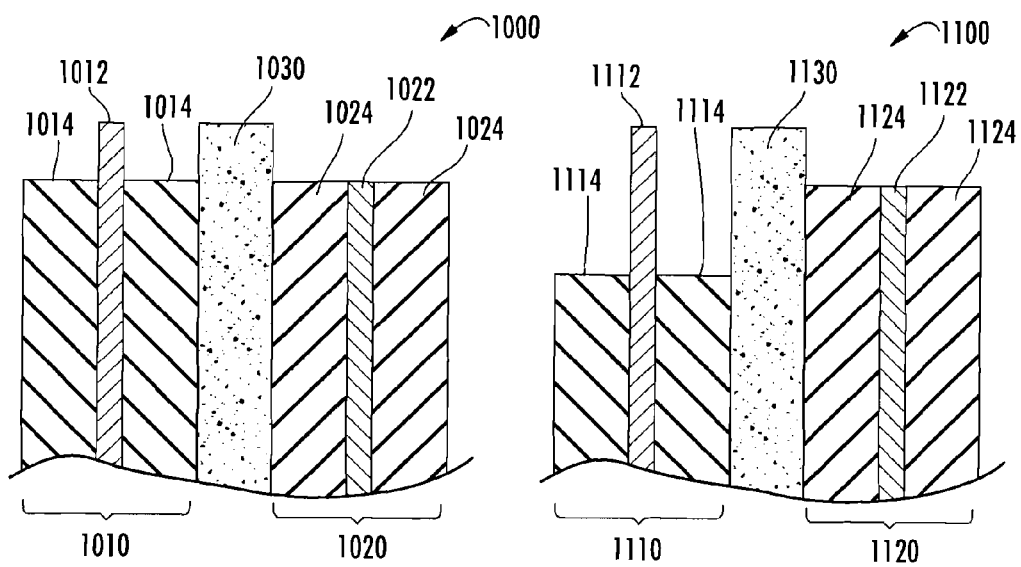
FIG. 14 is a cross-sectional view of a portion of a lithium-ion battery according to an exemplary embodiment.
FIG. 15 is a cross-sectional view of a portion of a lithium-ion battery according to an exemplary embodiment.

FIG. 14 is a cross-sectional view of a portion of a lithium-ion battery 1000 that includes a negative electrodes 1010, a positive electrode 1020, and a separator 1030 provided between the positive and negative electrodes. The negative electrode 1010 includes a current collector 1012 and an active material 1014 provided thereon, and the positive electrode 1020 includes a current collector 1022 and an active material 1024 provided thereon. As shown in FIG. 14, the negative active material 1014 does not extend to the edge of the negative current collector 1012 but is substantially coextensive or coterminous with the positive electrode 1020 and the positive active material 1024 provided thereon. According to an exemplary embodiment, the negative active material 1014 terminates between approximately 0 and 5 millimeters before the edge of the negative current collector 1012. The amount of negative active material (e.g., the amount by which the active material terminates before the edge of the current collector) may be selected so that there is an adequate or optimal amount of negative active material to intercalate the active lithium in the battery without resulting in lithium plating at the edges of the electrodes.

FIG. 15 is a cross-sectional view of a portion of a lithium-ion battery 1100 that includes a negative electrodes 1110, a positive electrode 1120, and a separator 1130 provided between the positive and negative electrodes. The negative electrode 1110 includes a current collector 1112 and an active material 1114 provided thereon, and the positive electrode 1120 includes a current collector 1122 and an active material 1124 provided thereon. As shown in FIG. 15, the negative current collector 1112 extends beyond the edge of the positive electrode 1120. The negative active material 1114 does not extend to the edge of the negative current collector 1112, and also does not extend such that it is coextensive or coterminous with the positive electrode 1120 and the active material 1124 provided thereon. According to an exemplary embodiment, the negative active material 1114 terminates between approximately 0 and 5 millimeters before the edge of the negative current collector 1112. The amount of negative active material (e.g., the amount by which the active material terminates before the edge of the current collector) may be selected so that there is an adequate or optimal amount of negative active material to intercalate the active lithium in the battery without resulting in lithium plating at the edges of the electrodes.

Figure 16:
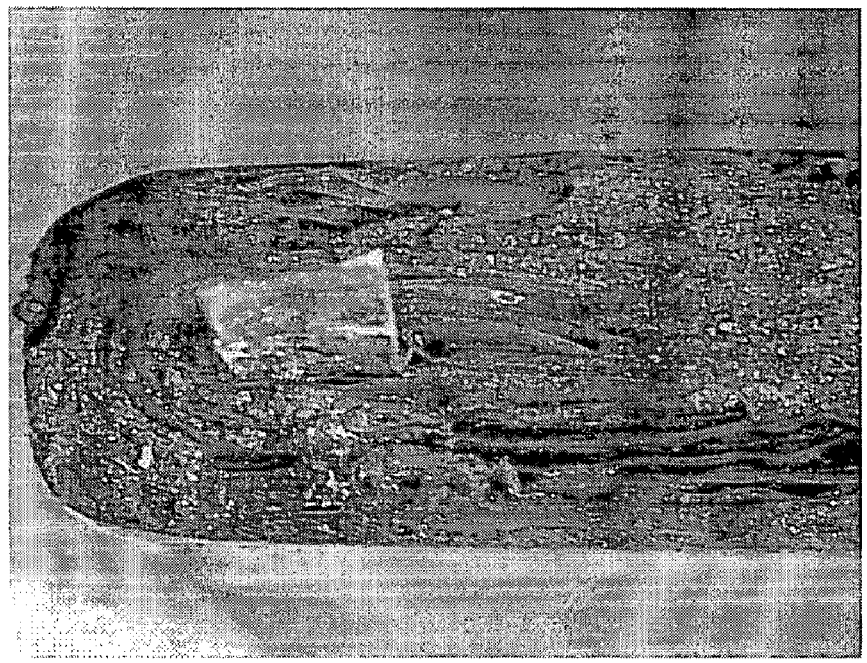
FIG. 16 is a photograph showing a portion of a lithium-ion battery using a carbonaceous negative active material.
Figure 17:
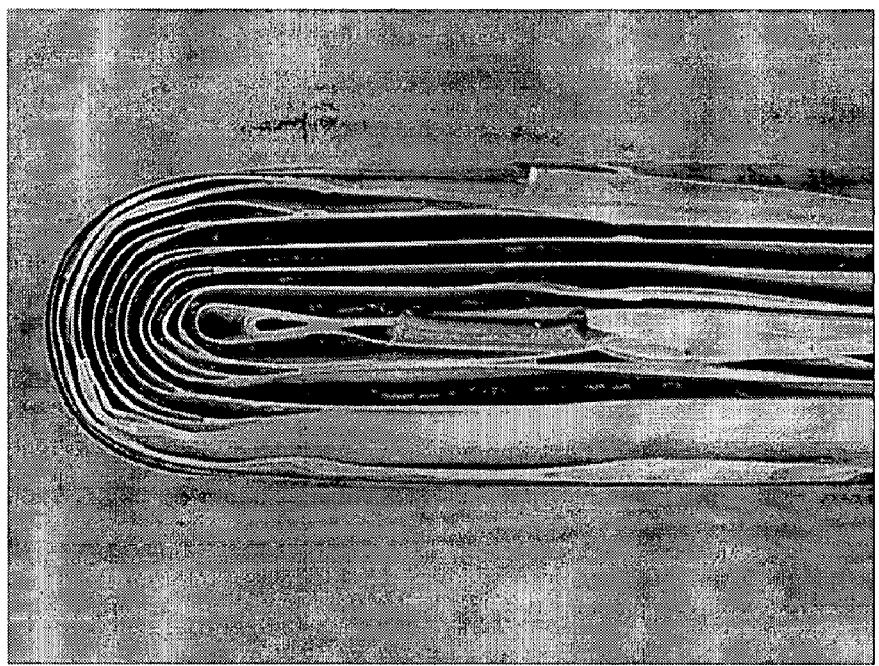
FIG. 17 is a photograph showing a portion of a lithium-ion battery using a lithium titanate negative active material.
Figure 20:
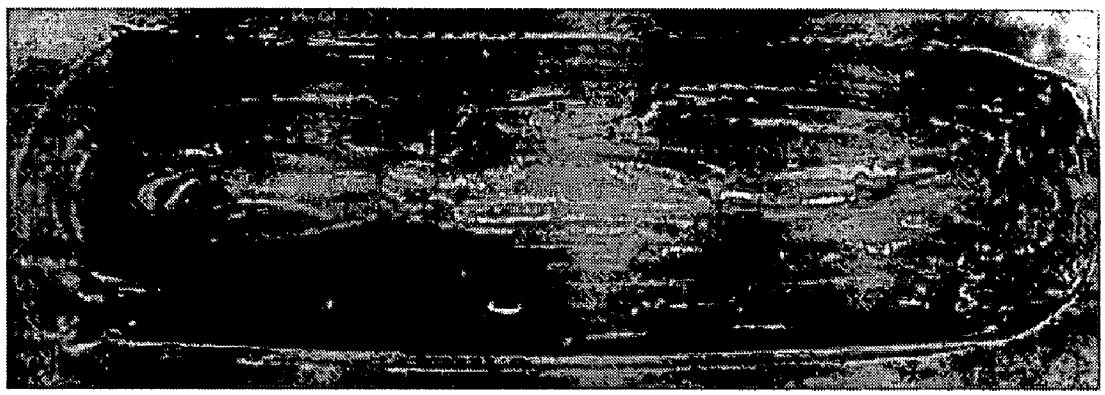
FIG. 20 is a photograph showing a portion of a lithium-ion battery using a carbonaceous negative active material and employing a design rule in which the negative electrode extends beyond the positive electrode.

FIGS. 16-17 illustrate one advantage of using negative active materials such as those described above (e.g., lithium titanate active materials). FIG. 16 is a photograph showing the edge of a lithium-ion battery in which a carbonaceous negative active material that included mesocarbon microbeads was used on the negative current collector. In the example shown in FIG. 16, the edge of the negative electrode did not extend beyond the edge of the positive electrode (i.e., their edges were coextensive or coterminous). Extended battery cycling was performed, after which the battery was cut apart and viewed. As shown by the bright spots on the edges of the negative electrodes in FIG. 16, relatively severe lithium plating occurred during cycling of the battery. Notably, if the lithium-ion battery with a carbonaceous negative active material is built following the design rule that the negative electrode must extend beyond the positive electrode (e.g., by up to approximately 1 millimeter or more), lithium plating will generally not occur, as illustrated in FIG. 20.

The battery shown in FIG. 17, in contrast to that shown in FIG. 16, utilized a lithium titanate ($Li_4Ti_5O_{12}$) active material on the negative electrode. Similar to the battery shown in FIG.

16, the edges of the negative electrode were coextensive or coterminous with those of the positive electrode. The battery was then subjected to extended cycling (100 cycles at an accelerated charge discharge rate). As shown in FIG. 17, no lithium plating is readily apparent at the edges of the negative electrodes.

As described above, one advantageous feature associated with the use of negative active materials that have potentials that greatly exceed that of carbon (e.g., lithium titanate materials) is that design rules requiring that the negative active material extend beyond the positive active material by up to one millimeter or more may be eliminated. The inventors have discovered that the use of such high potential materials may also allow the production of batteries in which the positive active material and/or positive electrode may extend beyond the negative active material and/or negative electrode by several millimeters without resulting in lithium plating (e.g., up to 10 millimeters in some cases). This provides enhanced flexibility in the design of lithium-based batteries in addition to allowing for variability in the manufacturing/assembly process (e.g., in the past, negative electrodes had to extend beyond the positive electrodes to compensate for potential misalignments between the electrodes that may result in lithium plating; the use of higher potential materials may eliminate the need to compensate for such variability).

Figure 18:
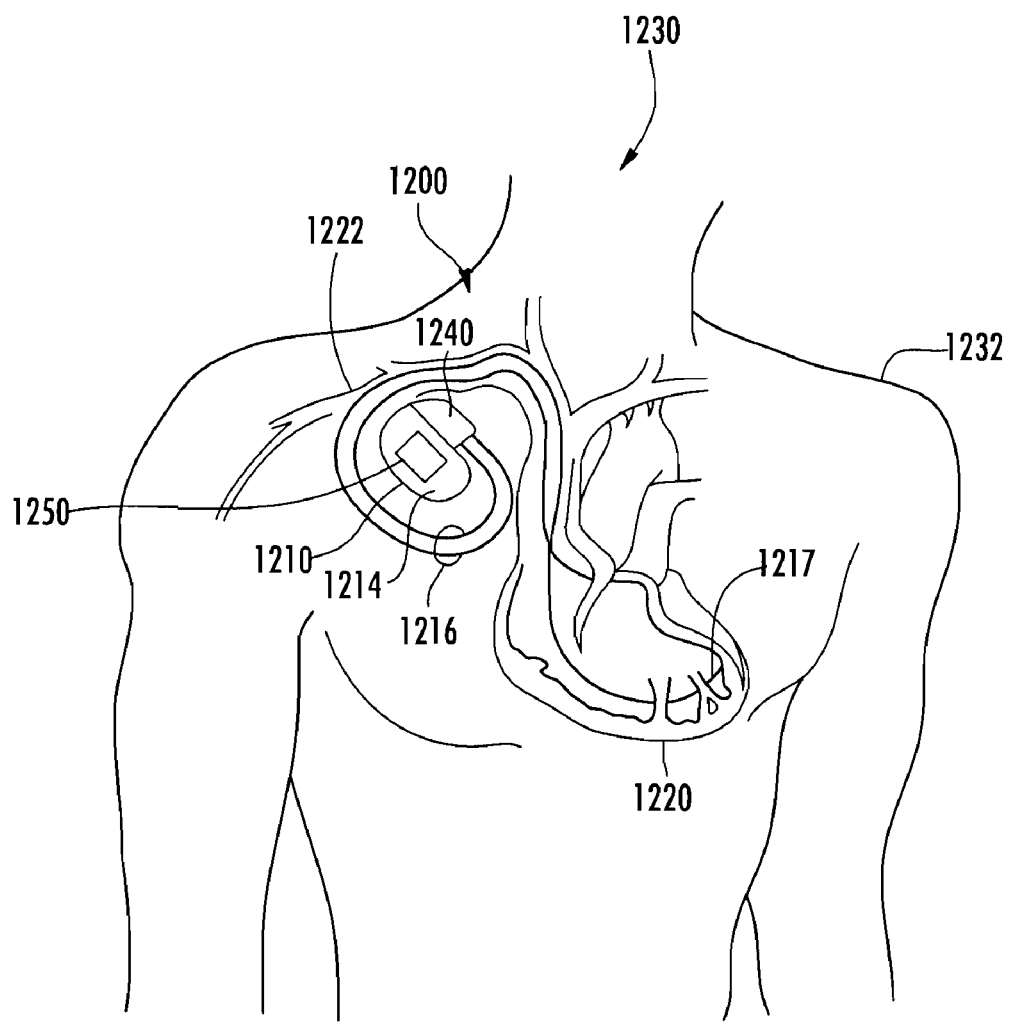
FIG. 18 is a schematic view of an implantable medical device (IMD) provided within the body of a patient according to an exemplary embodiment.

The batteries described herein may find utility in a variety of applications, including in implantable medical devices (IMDs). FIG. 18 illustrates a schematic view of a system 1200 (e.g., an implantable medical device) implanted within a body or torso 1232 of a patient 1230. The system 1200 includes a device 1210 in the form of an implantable medical device that for purposes of illustration is shown as a defibrillator configured to provide a therapeutic high voltage (e.g., 700 volt) treatment for the patient 1230.

The device 1210 includes a container or housing 1214 that is hermetically sealed and biologically inert according to an exemplary embodiment. The container may be made of a conductive material. One or more leads 1216 electrically connect the device 1210 and to the patient's heart 1220 via a vein 1222. Electrodes 1217 are provided to sense cardiac activity and/or provide an electrical potential to the heart 1220. At least a portion of the leads 1216 (e.g., an end portion of the leads shown as exposed electrodes 1217) may be provided adjacent or in contact with one or more of a ventricle and an atrium of the heart 1220.

The device 1210 includes a battery 1240 provided therein to provide power for the device 1210. The size and capacity of the battery 1240 may be chosen based on a number of factors, including the amount of charge required for a given patient's physical or medical characteristics, the size or configuration of the device, and any of a variety of other factors. According to an exemplary embodiment, the battery is a 5 mAh battery. According to another exemplary embodiment, the battery is a 300 mAh battery. According to various other exemplary embodiments, the battery may have a capacity of between approximately 1 and 1000 mAh.

According to other exemplary embodiments, more than one battery may be provided to power the device 1210. In such exemplary embodiments, the batteries may have the same capacity or one or more of the batteries may have a higher or lower capacity than the other battery or batteries. For example, according to an exemplary embodiment, one of the batteries may have a capacity of approximately 500 mAh while another of the batteries may have a capacity of approximately 75 mAh.

According to an exemplary embodiment, the battery may be configured such that it may be charged and recharged using an inductive charging system in which a primary or external coil is provided at an exterior surface of a portion of the body (either proximate or some distance away from the battery) and a secondary or internal coil is provided below the skin adjacent the primary coil.

Figure 19:
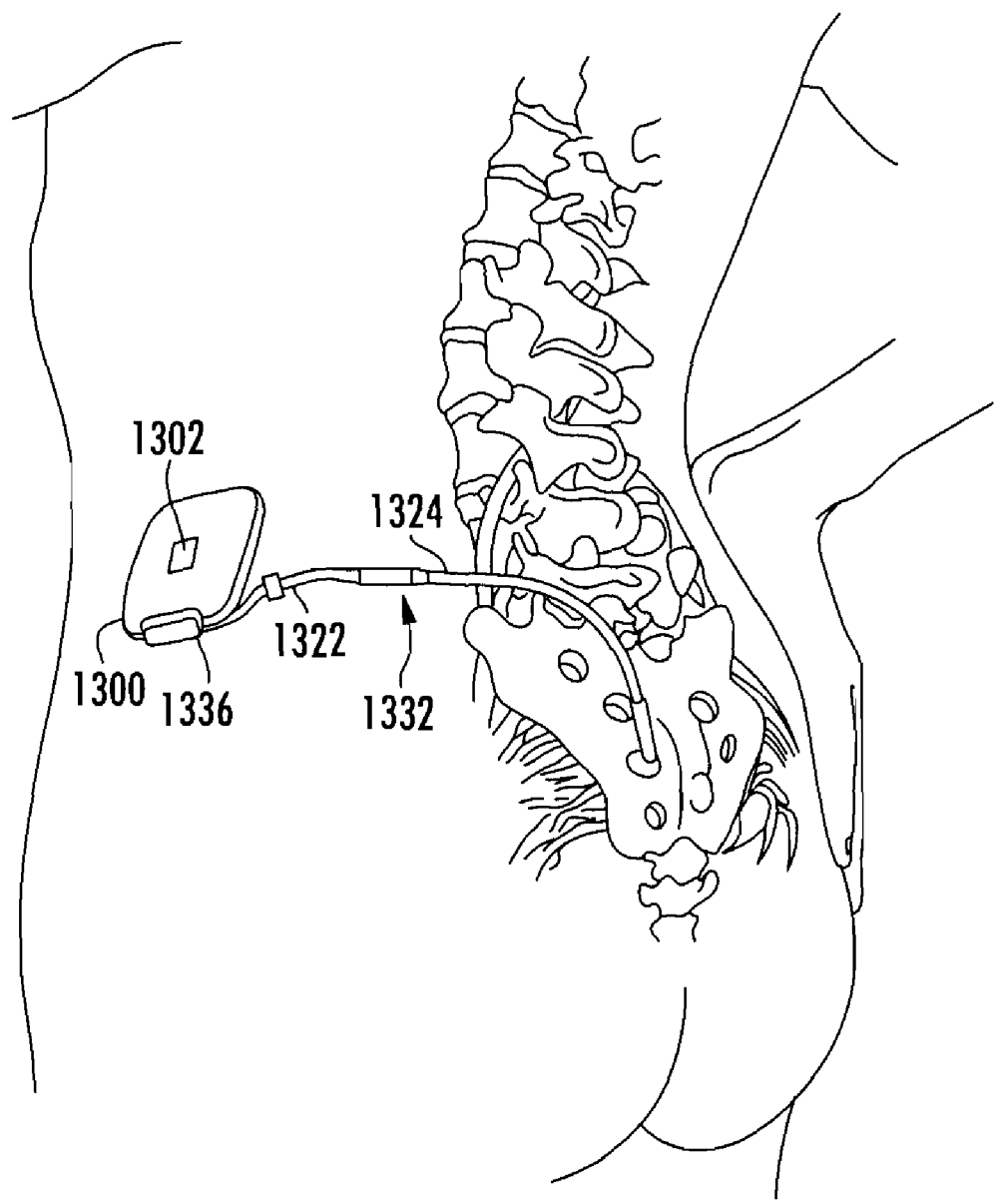
FIG. 19 is a schematic view of another implantable medical device (IMD) provided within the body of a patient according to an exemplary embodiment.

According to another exemplary embodiment shown in FIG. 19, an implantable neurological stimulation device 1300 (an implantable neuro stimulator or INS) may include a battery 1302 such as those described above with respect to the various exemplary embodiments. Examples of some neuro stimulation products and related components are shown and described in a brochure titled "Implantable Neurostimulation Systems" available from Medtronic, Inc.

An INS generates one or more electrical stimulation signals that are used to influence the human nervous system or organs. Electrical contacts carried on the distal end of a lead are placed at the desired stimulation site such as the spine or brain and the proximal end of the lead is connected to the INS. The INS is then surgically implanted into an individual such as into a subcutaneous pocket in the abdomen, pectoral region, or upper buttocks area. A clinician programs the INS with a therapy using a programmer. The therapy configures parameters of the stimulation signal for the specific patient's therapy. An INS can be used to treat conditions such as pain, incontinence, movement disorders such as epilepsy and Parkinson's disease, and sleep apnea. Additional therapies appear promising to treat a variety of physiological, psychological, and emotional conditions. Before an INS is implanted to deliver a therapy, an external screener that replicates some or all of the INS functions is typically connected to the patient to evaluate the efficacy of the proposed therapy.

The INS 1300 includes a lead extension 1322 and a stimulation lead 1324. The stimulation lead 1324 is one or more insulated electrical conductors with a connector 1332 on the proximal end and electrical contacts (not shown) on the distal end. Some stimulation leads are designed to be inserted into a patient percutaneously, such as the Model 3487A Pisces-Quad® lead available from Medtronic, Inc. of Minneapolis Minn., and stimulation some leads are designed to be surgically implanted, such as the Model 3998 Specify® lead also available from Medtronic.

Although the lead connector 1332 can be connected directly to the INS 1300 (e.g., at a point 1336), typically the lead connector 1332 is connected to a lead extension 1322. The lead extension 1322, such as a Model 7495 available from Medtronic, is then connected to the INS 1300.

Implantation of an INS 1300 typically begins with implantation of at least one stimulation lead 1324, usually while the patient is under a local anesthetic. The stimulation lead 1324 can either be percutaneously or surgically implanted. Once the stimulation lead 1324 has been implanted and positioned, the stimulation lead's 1324 distal end is typically anchored into position to minimize movement of the stimulation lead 1324 after implantation. The stimulation lead's 1324 proximal end can be configured to connect to a lead extension 1322.

The INS 1300 is programmed with a therapy and the therapy is often modified to optimize the therapy for the patient (i.e., the INS may be programmed with a plurality of programs or therapies such that an appropriate therapy may be administered in a given situation).

A physician programmer and a patient programmer (not shown) may also be provided to allow a physician or a patient to control the administration of various therapies. A physician programmer, also known as a console programmer, uses telemetry to communicate with the implanted INS 1300, so a clinician can program and manage a patient's therapy stored in the INS 1300, troubleshoot the patient's INS system, and/or collect data. An example of a physician programmer is a Model 7432 Console Programmer available from Medtronic. A patient programmer also uses telemetry to communicate with the INS 1300, so the patient can manage some aspects of her therapy as defined by the clinician. An example of a patient programmer is a Model 7434 Itrel® 3 EZ Patient Programmer available from Medtronic.

According to an exemplary embodiment, a battery provided as part of the INS 1300 may be configured such that it may be charged and recharged using an inductive charging system in which a primary or external coil is provided at an exterior surface of a portion of the body (either proximate or some distance away from the battery) and a secondary or internal coil is provided below the skin adjacent the primary coil.

While the medical devices described herein (e.g., systems 1200 and 1300) are shown and described as a defibrillator and a neurological stimulation device, it should be appreciated that other types of implantable medical devices may be utilized according to other exemplary embodiments, such as pacemakers, cardioverters, cardiac contractility modules, drug administering devices, diagnostic recorders, cochlear implants, and the like for alleviating the adverse effects of various health ailments.

It is also contemplated that the medical devices described herein may be charged or recharged when the medical device is implanted within a patient. That is, according to an exemplary embodiment, there is no need to disconnect or remove the medical device from the patient in order to charge or recharge the medical device.

It should be noted that references to "front," "back," "upper," and "lower" in this description are merely used to identify various elements as are oriented in the FIGURES, with "front" and "back" being relative the vehicle in which the battery assembly is placed.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the batteries and cells as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions as expressed in the appended claims.

What is claimed is:

1. A lithium-ion battery comprising:
a plurality of generally planar positive and negative electrodes arranged in alternating fashion to form an electrode stack, each of the electrodes comprising a current collector having two opposed surfaces and an active material provided on at least one of the two opposed surfaces;
wherein the active material of the negative electrodes has a potential that is greater than 0.2 volts versus a lithium reference electrode;
wherein the area of the current collectors of the negative electrodes covered by active material is not larger than the area of the current collectors of the positive electrodes covered by active material.

2. The lithium-ion battery of claim 1, wherein the area of the current collectors of the positive electrodes covered by active material is greater than the area of the current collectors of the negative electrodes covered by active material.

3. The lithium-ion battery of claim 1, wherein the current collectors comprise at least one edge and the active material of the negative electrodes extends to the at least one edge of the current collectors.

4. The lithium-ion battery of claim 1, wherein negative electrodes do not have a larger surface area than that of the positive electrodes.

5. The lithium-ion battery of claim 1, wherein the electrodes include a plurality of edges and first edges of the positive electrodes are provided adjacent first edges of the negative electrodes, and the active material of the negative electrodes does not extend beyond the first edges of the positive electrodes.

6. The lithium-ion battery of claim 5, wherein the active material of the negative electrodes does not extend beyond the active material of the positive electrodes near the first edges.

7. The lithium-ion battery of claim 1, wherein the active material provided on the negative electrodes has a potential that is greater than 0.3 volts versus a lithium reference electrode.

8. The lithium-ion battery of claim 1, wherein the active material provided on the negative electrodes has a potential that is approximately 1.5 volts versus a lithium reference electrode.

9. The lithium-ion battery of claim 1, wherein the active material provided on the negative electrodes is a lithium titanate material.

10. The lithium-ion battery of claim 9, wherein the lithium titanate material is $Li_4Ti_5O_{12}$.

11. The lithium-ion battery of claim 1, wherein the active material provided on the negative electrodes is a lithium titanate material selected from the group consisting of $LiTi_2O_4$, $Li_2TiO_3$, $Li_xTi_yO_4$ where $1.0 \leq x \leq 1.6$ and $1.6 \leq y \leq 2.0$, and combinations thereof.

12. The lithium-ion battery of claim 1, wherein the active material provided on the negative electrodes is selected from the group consisting of $TiO_2$, $WO_2$, $WO_3$, $MoO_2$, $Nb_2O_5$, $LiWO_2$, $V_6O_{13}$, $Li_6Fe_2O_3$, $LiFeO_2$, $Fe_2O_3$, and combinations thereof.

13. The lithium-ion battery of claim 1, wherein the active material of the positive electrodes has a potential of at least 3 volts versus a lithium reference electrode.

14. The lithium-ion battery of claim 1, wherein the positive electrodes and negative electrodes have a generally rectangular shape.

15. A lithium-ion battery comprising:
an element comprising a plurality of alternating generally planar positive and negative electrodes each having a plurality of edges, the negative electrodes comprising an active material having a potential that is greater than 0.2 volts versus a lithium reference electrode;
wherein the element comprises at least one edge region that comprises edges of the positive electrodes and edges of the negative electrodes;
wherein the active material provided on the negative electrodes does not extend beyond the edges of the positive electrodes in the edge region.

16. The lithium-ion battery of claim 15, wherein the positive electrodes comprise an active material and the area of the positive electrodes covered by active material is not smaller than the area of the negative electrodes covered by active material.

17. The lithium-ion battery of claim 15, wherein the area of the positive electrodes covered by active material is larger than the area of the negative electrodes covered by active material.

18. The lithium-ion battery of claim 15, wherein the edges of the negative electrodes do not extend beyond the edges of the positive electrodes in the edge region.

19. The lithium-ion battery of claim 15, wherein the positive electrodes comprise an active material and the active material of the negative electrodes does not extend beyond the active material of the positive electrodes near the edges of the positive and negative electrodes.

20. The lithium-ion battery of claim 19, wherein the active material of the positive electrodes extends beyond the active material of the negative electrodes near the edges of the positive and negative electrodes.

21. The lithium-ion battery of claim 15, wherein the edges of the positive and negative electrodes in the edge region are generally coplanar.

22. The lithium-ion battery of claim 15, wherein the active material of the negative electrodes has a potential that is greater than 0.3 volts versus a lithium reference electrode.

23. The lithium-ion battery of claim 15, wherein the active material of the negative electrodes has a potential that is approximately 1.5 volts versus a lithium reference electrode.

24. The lithium-ion battery of claim 15, wherein the active material of the negative electrodes is selected from the group consisting of $TiO_2$, $WO_2$, $WO_3$, $MoO_2$, $Nb_2O_5$, $LiWO_2$, $V_6O_{13}$, $Li_6Fe_2O_3$, $LiFeO_2$, $Fe_2O_3$, a lithium titanate material, and combinations thereof.

25. The lithium-ion battery of claim 24, wherein the active material of the negative electrodes is $Li_4Ti_5O_{12}$.

26. The lithium-ion battery of claim 24, wherein the active material of the negative electrodes is a lithium titanate material selected from the group consisting of $LiTi_2O_4$, $Li_2TiO_3$, $Li_xTi_yO_4$ where $1.0 \leq x \leq 1.6$ and $1.6 \leq y \leq 2.0$, and combinations thereof.

27. The lithium-ion battery of claim 15, wherein the positive and negative electrodes are generally rectangular.

28. A lithium-ion battery comprising:
a plurality of alternating positive and negative electrodes, the positive and negative electrodes having a generally planar rectangular configuration and comprising a current collector with two opposed surfaces, at least a portion of at least one of the two opposed surfaces for each of the electrodes having an active material provided thereon;
wherein the active material provided on the negative electrodes has a potential that is greater than 0.2 volts versus a lithium reference electrode; and
wherein for at least a plurality of the negative electrodes, the area of the active material is not larger than the area of the active material on an adjacent positive electrode.

29. The lithium-ion battery of claim 28, wherein the active material of the negative electrodes has a potential that is greater than 0.3 volts versus a lithium reference electrode.

30. The lithium-ion battery of claim 28, wherein the active material of the negative electrodes is a lithium titanate material.

31. The lithium-ion battery of claim 30, wherein the lithium titanate material is selected from the group consisting of $LiTi_2O_4$, $Li_2TiO_3$, $Li_xTi_yO_4$ where $1.0 \leq x \leq 1.6$ and $1.6 \leq y \leq 2.0$, $Li_4Ti_5O_{12}$, and combinations thereof.

32. The lithium-ion battery of claim 28, wherein the active material of the negative electrodes is selected from the group consisting of $TiO_2$, $WO_2$, $WO_3$, $MoO_2$, $Nb_2O_5$, $LiWO_2$, $V_6O_{13}$, $Li_6Fe2O_3$, $LiFeO_2$, $Fe_2O_3$, and combinations thereof.

33. The lithium-ion battery of claim 28, wherein the active material of the negative electrodes extends to an edge of the negative electrodes but does not extend beyond an edge of an adjacent positive electrode.

34. The lithium-ion battery of claim 28, wherein the active material of the negative electrodes does not extend beyond the active material of an adjacent positive electrode near at least one edge of the electrodes.

35. The lithium-ion battery of claim 28, wherein the current collector of the negative electrode comprises aluminum.

* * * * *